US012691676B2

(12) United States Patent
Miyazawa

(10) Patent No.: US 12,691,676 B2
(45) **Date of Patent: *Jul. 28, 2026**

(54) HEAD UNIT AND LIQUID DISPENSING APPARATUS

(71) Applicant: SEIKO EPSON CORPORATION, Tokyo (JP)

(72) Inventor: Makoto Miyazawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

This patent is subject to a terminal disclaimer.

(21) Appl. No.: 18/627,522

(22) Filed: Apr. 5, 2024

(65) Prior Publication Data

US 2024/0336062 A1 Oct. 10, 2024

(30) Foreign Application Priority Data

Apr. 7, 2023 (JP) ................................ 2023-062598

(51) Int. Cl.
*B41J 2/045* (2006.01)
*B41J 2/14* (2006.01)
*B41J 2/17* (2006.01)

(52) U.S. Cl.
CPC ....... *B41J 2/04508* (2013.01); *B41J 2/04563* (2013.01); *B41J 2/04573* (2013.01);
(Continued)

(58) Field of Classification Search
CPC ......................... B41J 2/04508; B41J 2/04563; B41J 2/04573; B41J 2/04581; B41J 2/04588;
(Continued)

(56) References Cited

U.S. PATENT DOCUMENTS 5,745,132 A 4/1998 Hirabayashi et al.
11,701,879 B2 * 7/2023 Sato .................... B41J 2/04563 347/14

(Continued)

FOREIGN PATENT DOCUMENTS

JP 2014138979 A * 7/2014 .......... B41J 2/04551
JP 7029688 B2 3/2022
JP 2022-124599 A 8/2022

*Primary Examiner* — Ricardo I Magallanes
*Assistant Examiner* — Tracy M Mcmillion
(74) *Attorney, Agent, or Firm* — Spencer Fane LLP

(57) ABSTRACT

Provided is a head unit including an elapsed time acquisition unit configured to acquire elapsed time information, a unit temperature detection circuit configured to output a unit temperature signal including a unit temperature information indicating a temperature of the head unit, a print head configured to dispense liquid when receiving a drive signal, and a temperature information output circuit configured to acquire a temperature signal indicating a temperature of the print head and output a temperature information signal based on the temperature signal, in which the print head includes a temperature detection unit located at the other side in a stacking direction with respect to a vibration plate and configured to detect temperature information corresponding to a temperature of the pressure chamber and output the detected temperature information as the temperature signal, the temperature information output circuit includes a correction circuit configured to correct the temperature signal, and the correction circuit corrects the temperature signal based on the unit temperature information at a predetermined timing after the elapsed time information acquired by the elapsed time acquisition unit elapses a predetermined time.

10 Claims, 11 Drawing Sheets

(52) U.S. Cl.
CPC ....... *B41J 2/04581* (2013.01); *B41J 2/04588* (2013.01); *B41J 2/14233* (2013.01); *B41J 2/1707* (2013.01); *B41J 2002/14258* (2013.01)

(58) Field of Classification Search
CPC .................. B41J 2/14233; B41J 2/1707; B41J 2002/14258; B41J 2002/14354; B41J 2/04541; B41J 2/04593; B41J 2/04596
See application file for complete search history.

(56) References Cited

U.S. PATENT DOCUMENTS

| | | | |
|---|---|---|---|
| 2011/0221820 | A1 | 9/2011 | Shibata |
| 2013/0215177 | A1 | 8/2013 | Sugita |
| 2019/0092001 | A1 | 3/2019 | Furukawa |
| 2019/0092004 | A1 | 3/2019 | Chikamoto |
| 2021/0178756 | A1 | 6/2021 | Anderson et al. |
| 2022/0258472 | A1 | 8/2022 | Hirai et al. |
| 2024/0336062 | A1 | 10/2024 | Miyazawa |

* cited by examiner

FIG. 8
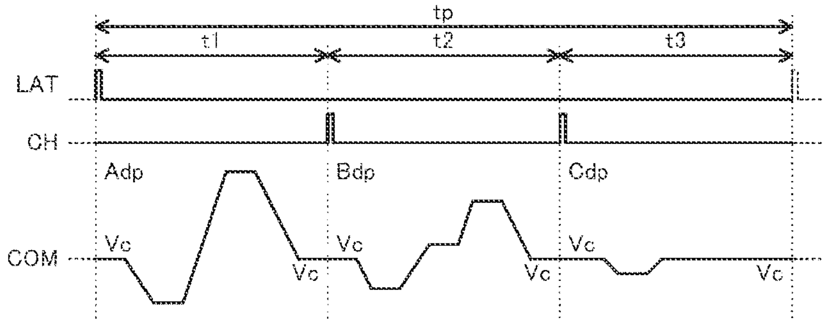
FIG. 9
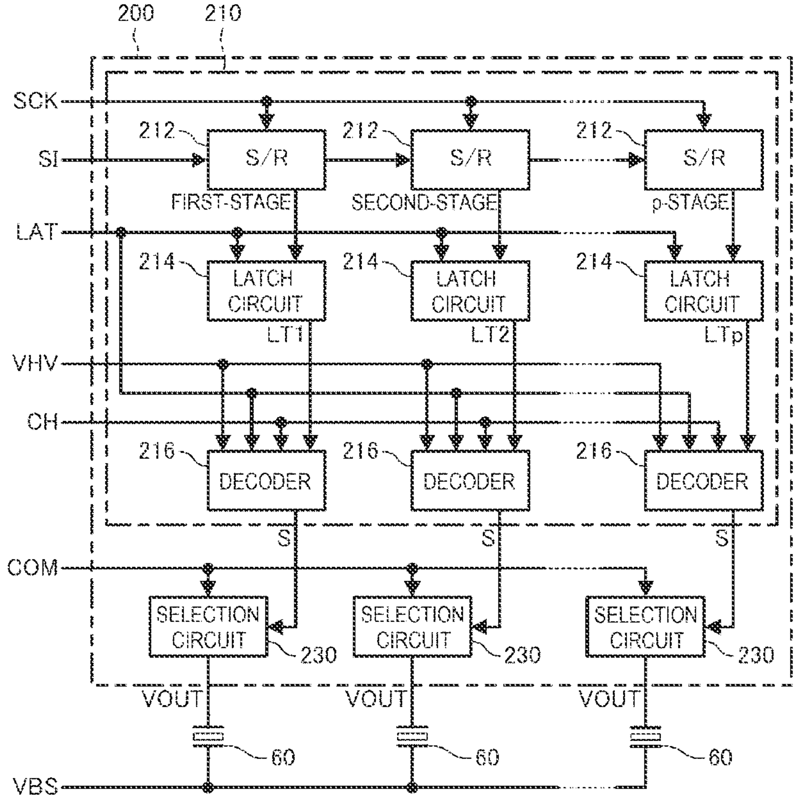
FIG. 10
| | | LD | MD | SD | ND |
|---|---|---|---|---|---|
| [SIH, SIL] | | [1, 1] | [1, 0] | [0, 1] | [0, 0] |
| S | T1 | H | H | L | L |
| | T2 | H | L | H | L |
| | T3 | L | L | L | H |

HEAD UNIT AND LIQUID DISPENSING APPARATUS

The present application is based on, and claims priority from JP Application Serial Number 2023-062598, filed Apr. 7, 2023, the disclosure of which is hereby incorporated by reference herein in its entirety.

BACKGROUND

1. Technical Field

The present disclosure relates to a head unit and a liquid dispensing apparatus.

2. Related Art

A configuration is known in which a liquid dispensing apparatus includes a print head including a piezoelectric element, a pressure chamber, and a nozzle communicating with the pressure chamber. The print head dispenses a liquid supplied to the pressure chamber from the nozzle by changing a volume of the pressure chamber by driving the piezoelectric element. In the liquid dispensing apparatus including such a print head, a technique is known in which dispensing control suitable for a temperature of ink stored in the print head is implemented by driving and controlling the piezoelectric element based on the temperature of the ink.

For example, JP-A-2022-124599 discloses a technique in which a temperature detector that detects a temperature of a pressure chamber in which ink is stored is provided inside a print head including a piezoelectric element, the pressure chamber, and a nozzle, a temperature difference between the temperature detected by the temperature detector and a temperature in the pressure chamber can be reduced, and accuracy of detecting a temperature of the ink stored in the pressure chamber is improved.

JP-A-2022-124599 is an example of the related art.

However, in the configuration in which the temperature detector is provided inside the print head as in a liquid dispensing apparatus disclosed in JP-A-2022-124599, the accuracy of detecting the temperature may decrease with the use of the print head, which means there is room for improvement.

SUMMARY

A head unit according to an aspect of the present disclosure is a head unit for dispensing liquid when receiving a drive signal corrected based on a temperature information signal, the head unit includes:

- an elapsed time acquisition unit configured to acquire elapsed time information;
- a unit temperature detection circuit configured to output a unit temperature signal including unit temperature information indicating a temperature of the head unit;
- a print head configured to dispense the liquid when receiving the drive signal; and
- a temperature information output circuit configured to acquire a temperature signal indicating a temperature of the print head and output the temperature information signal based on the temperature signal, in which
- the print head includes
  - a piezoelectric element including a first electrode, a second electrode, and a piezoelectric body located between the first electrode and the second electrode in a stacking direction in which the first electrode, the second electrode, and the piezoelectric body are stacked, the piezoelectric element being configured to be driven when receiving the drive signal,
  - a vibration plate located at one side in the stacking direction with respect to the piezoelectric element and configured to be deformed when the piezoelectric element is driven,
  - a pressure chamber substrate located at the one side in the stacking direction with respect to the vibration plate and provided with a pressure chamber whose volume changes when the vibration plate is deformed,
  - a nozzle configured to dispense the liquid according to a change in volume of the pressure chamber, and
  - a temperature detection unit located at the other side in the stacking direction with respect to the vibration plate and configured to detect temperature information corresponding to a temperature of the pressure chamber and output the detected temperature information as the temperature signal,
- the temperature information output circuit includes a correction circuit configured to correct the temperature signal, and
- the correction circuit corrects the temperature signal based on the unit temperature information at a predetermined timing after the elapsed time information acquired by the elapsed time acquisition unit elapses a predetermined time.

A liquid dispensing apparatus according to an aspect of the present disclosure includes:

- a drive circuit configured to output a drive signal corrected based on a temperature information signal; and
- a head unit configured to dispense liquid when receiving the drive signal, in which
- the head unit includes
  - an elapsed time acquisition unit configured to acquire elapsed time information,
  - a unit temperature detection circuit configured to output a unit temperature signal including unit temperature information indicating a temperature of the head unit,
  - a print head configured to dispense the liquid when receiving the drive signal, and
  - a temperature information output circuit configured to acquire a temperature signal indicating a temperature of the print head and output the temperature information signal based on the temperature signal,
- the print head includes
  - a piezoelectric element including a first electrode, a second electrode, and a piezoelectric body located between the first electrode and the second electrode in a stacking direction in which the first electrode, the second electrode, and the piezoelectric body are stacked, the piezoelectric element being configured to be driven when receiving the drive signal,
  - a vibration plate located at one side in the stacking direction with respect to the piezoelectric element and configured to be deformed when the piezoelectric element is driven,
  - a pressure chamber substrate located at the one side in the stacking direction with respect to the vibration plate and provided with a pressure chamber whose volume changes when the vibration plate is deformed,
  - a nozzle configured to dispense the liquid according to a change in volume of the pressure chamber, and a temperature detection unit located at the other side in the stacking direction with respect to the vibration plate and configured to detect temperature information corresponding to a temperature of the pressure chamber and output the detected temperature information as the temperature signal, the temperature information output circuit includes a correction circuit configured to correct the temperature signal, and the correction circuit corrects the temperature signal based on the unit temperature information at a predetermined timing after the elapsed time information acquired by the elapsed time acquisition unit elapses a predetermined time.

BRIEF DESCRIPTION OF THE DRAWINGS

FIG. 8 is a diagram illustrating an example of a signal waveform of a drive signal COM.

FIG. 9 is a diagram illustrating a configuration of the drive signal selection circuit.

FIG. 10 is a diagram illustrating an example of decoding contents in a decoder.

DESCRIPTION OF EMBODIMENTS

Hereinafter, preferred embodiments according to the present disclosure will be described with reference to the drawings. The used drawings are for convenience of description. The embodiments to be described below do not unduly limit the contents of the present disclosure described in the claims. In addition, not all configurations to be described below are necessarily essential components of the present disclosure.

1. First Embodiment

1.1 Structure of Liquid Dispensing Apparatus

Structure of Liquid Dispensing Apparatus

Figure 1:
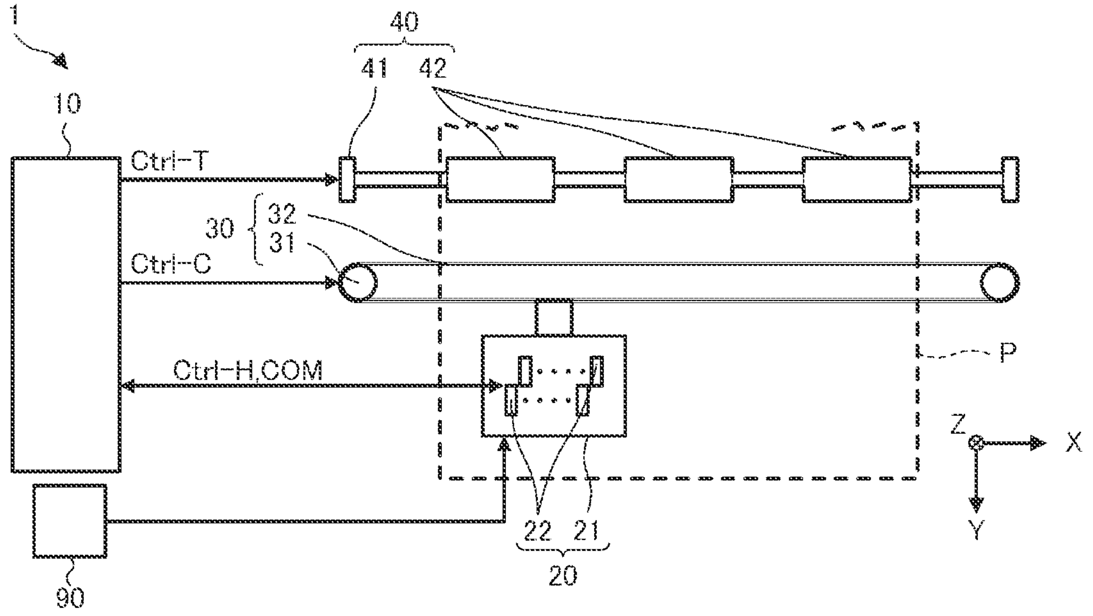
FIG. 1 is a diagram illustrating a schematic configuration of a liquid dispensing apparatus.

FIG. 1 is a diagram illustrating a schematic configuration of a liquid dispensing apparatus 1. The liquid dispensing apparatus 1 according to the embodiment is a so-called serial printing type ink jet printer in which a carriage 21 mounted with print heads 22 that dispense ink as an example of liquid reciprocates along a scanning axis and dispenses the ink onto a medium P conveyed along a conveyance direction to form a desired image on the medium P. Examples of the medium P in the liquid dispensing apparatus 1 include any printing target such as a printing sheet, a resin film, and cloth. The liquid dispensing apparatus 1 is not limited to the serial printing type ink jet printer, and may be a line printing type ink jet printer. In addition, the liquid dispensing apparatus 1 is not limited to an ink jet printer, and may be a color material dispensing apparatus used for manufacturing a color filter such as a liquid crystal display, an electrode material dispensing apparatus used for forming electrodes of an organic EL display and a field emission display (FED), a bioorganic substance dispensing apparatus used for manufacturing a biochip, a three-dimensional shaping apparatus, or a printing apparatus.

Here, in the following description, an X axis, a Y axis, and a Z axis which are three spatial axes orthogonal to one another are used. In the following description, when orientations of directions along the X axis, the Y axis, and the Z axis are specified, a tip side of an arrow indicating the direction along the X axis is referred to as a +X side and a starting point side thereof is referred to as a −X side, a tip side of an arrow indicating the direction along the Y axis is referred to as a +Y side and a starting point side thereof is referred to as a −Y side, and a tip side of an arrow indicating the direction along the Z axis is referred to as a +Z side and a starting point side thereof is referred to as a −Z side.

As illustrated in FIG. 1, the liquid dispensing apparatus 1 includes a control unit 10, a head unit 20, a movement unit 30, a conveyance unit 40, and an ink container 90.

The ink container 90 stores a plurality of types of ink to be dispensed onto the medium P. Examples of such an ink container 90 in which the ink is stored include an ink cartridge, a bag-shaped ink pack formed of a flexible film, and an ink tank that can be refilled with the ink.

The control unit 10 includes a processing circuit such as a central processing unit (CPU) or a field programmable gate array (FPGA) and a storage circuit such as a semiconductor memory, and controls the elements of the liquid dispensing apparatus 1 including the head unit 20.

The head unit 20 includes the carriage 21 and a plurality of print heads 22. The carriage 21 is fixed to an endless belt 32 provided in the movement unit 30 to be described later. The plurality of print heads 22 are mounted at the carriage 21. A control signal Ctrl-H and a drive signal COM that are output from the control unit 10 are input to each of the plurality of print heads 22. Further, the ink stored in the ink container 90 is supplied to each of the plurality of print heads 22 via tubes or the like (not illustrated). The print head 22 dispenses the ink supplied from the ink container 90 based on the input control signal Ctrl-H and the input drive signal COM. At this time, a direction along the Z axis in which the print head 22 dispenses the ink, which is a direction from the −Z side to the +Z side along the Z axis may be referred to as a dispensing direction.

The movement unit 30 includes a carriage motor 31 and the endless belt 32. The carriage motor 31 operates based on a control signal Ctrl-C received from the control unit 10. The endless belt 32 extends along the X axis and rotates as the carriage motor 31 operates. Accordingly, the carriage 21 fixed to the endless belt 32 moves along the X axis. That is, the movement unit 30 causes the plurality of print heads 22 mounted at the carriage 21 to reciprocate along the X axis. Here, in the following description, a direction along the X axis in which the plurality of print heads 22 mounted at the carriage 21 move may be referred to as a scanning direction.

The conveyance unit 40 includes a conveyance motor 41 and conveyance rollers 42. The conveyance motor 41 operates based on a control signal Ctrl-T received from the control unit 10. The conveyance rollers 42 rotate as the conveyance motor 41 operates in a state of sandwiching the medium P therebetween. Accordingly, the medium P sandwiched by the conveyance rollers 42 is conveyed from the −Y side to the +Y side along the Y axis. That is, the conveyance unit 40 conveys the medium P from the −Y side to the +Y side along the Y axis. Here, in the following description, a direction from the −Y side to the +Y side in which the medium P is conveyed may be referred to as the conveyance direction.

In the liquid dispensing apparatus 1 implemented in this way, the movement unit 30 controls the reciprocating movement of the carriage 21 along the scanning direction, and the conveyance unit 40 controls the conveyance of the medium P in the direction along the conveyance direction. The print head 22 mounted at the carriage 21 dispenses the ink in conjunction with the reciprocating movement of the carriage 21 along the scanning direction and the conveyance of the medium P in the conveyance direction. As a result, the ink dispensed by the print head 22 can be landed at any surface of the medium P, and a desired image is formed at the medium P.

Structure of Print Head

Figure 2:
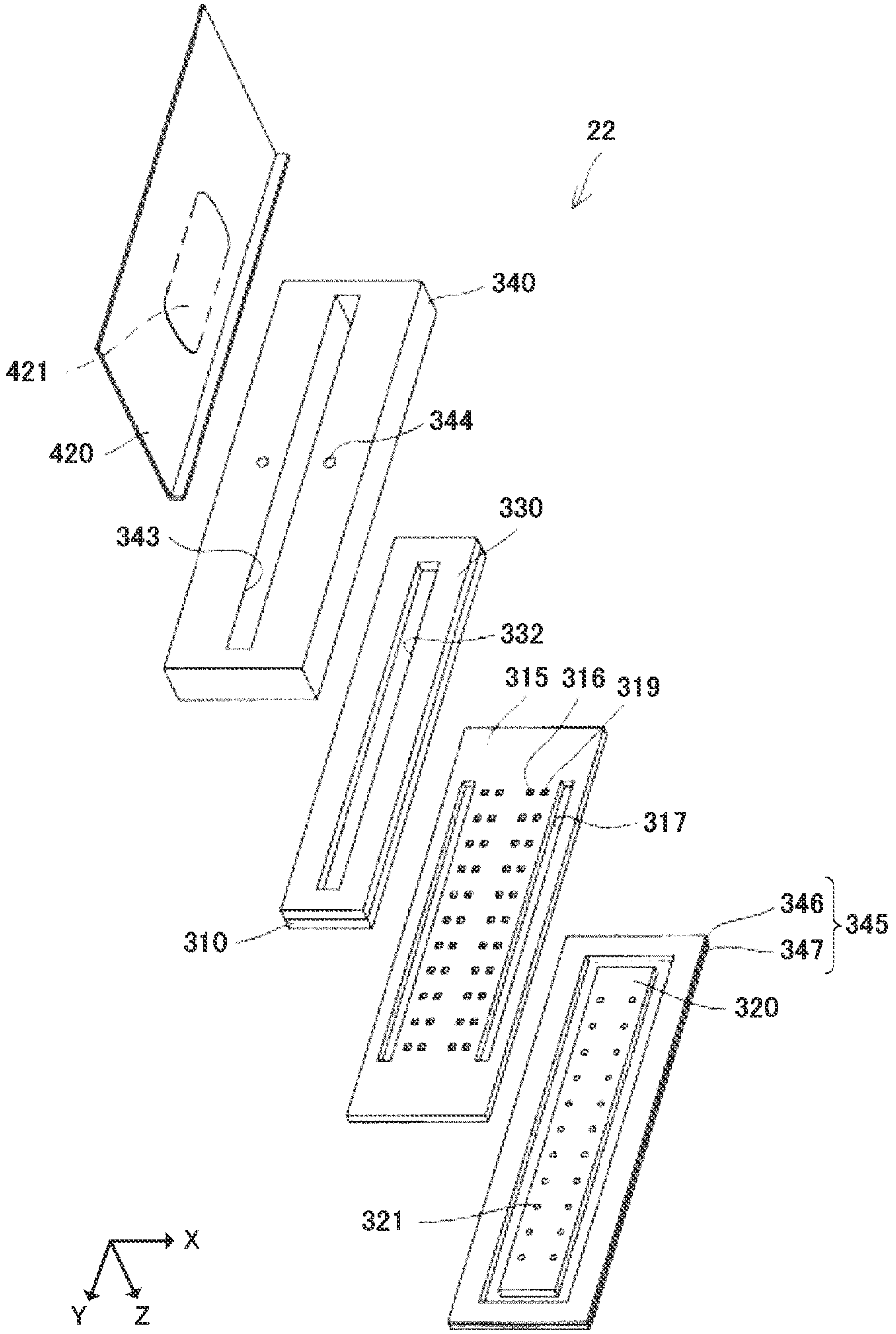
FIG. 2 is an exploded perspective view illustrating a structure of a print head.
Figure 3:
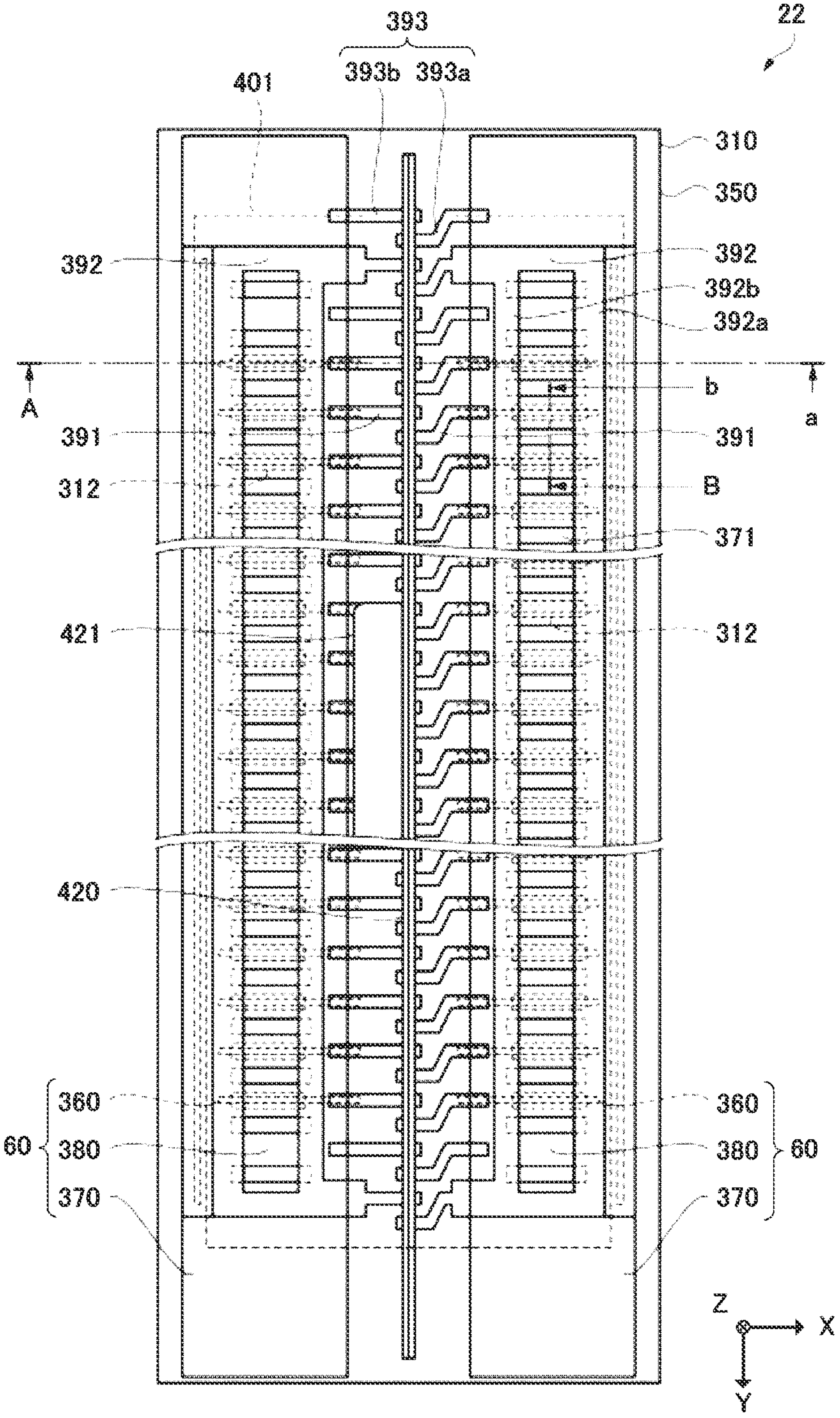
FIG. 3 is a plan view of the print head as viewed along a Z axis.
Figure 4:
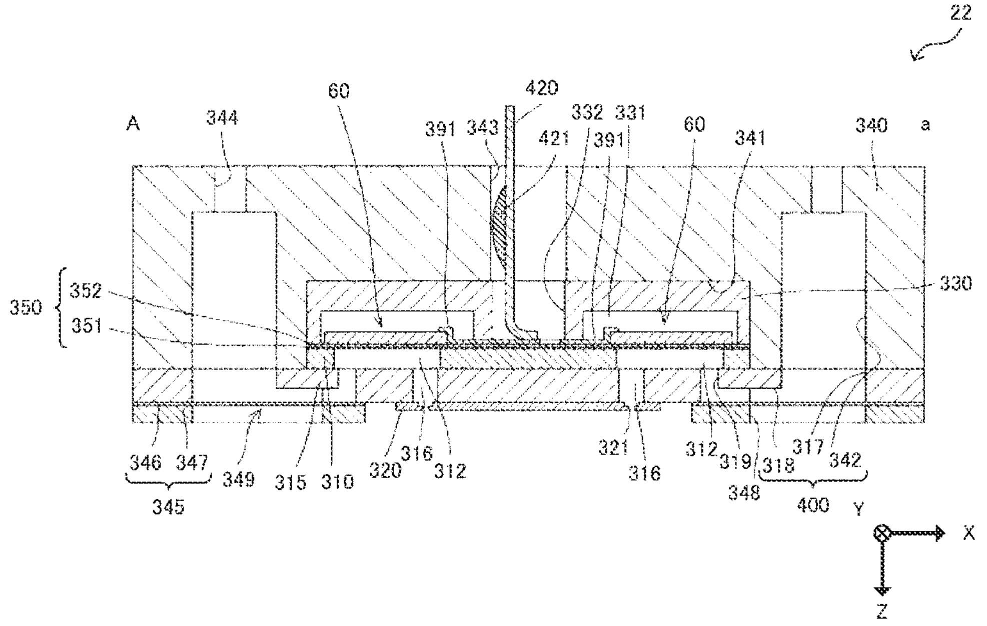
FIG. 4 is a cross-sectional view illustrating an A-a cross-section illustrated in FIG. 3.
Figure 5:
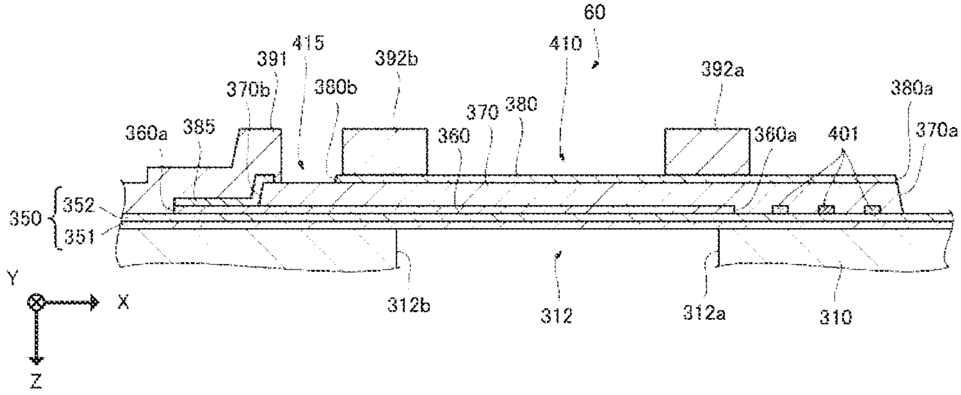
FIG. 5 is a detailed main-part view illustrating details of main parts in FIG. 4.
Figure 6:
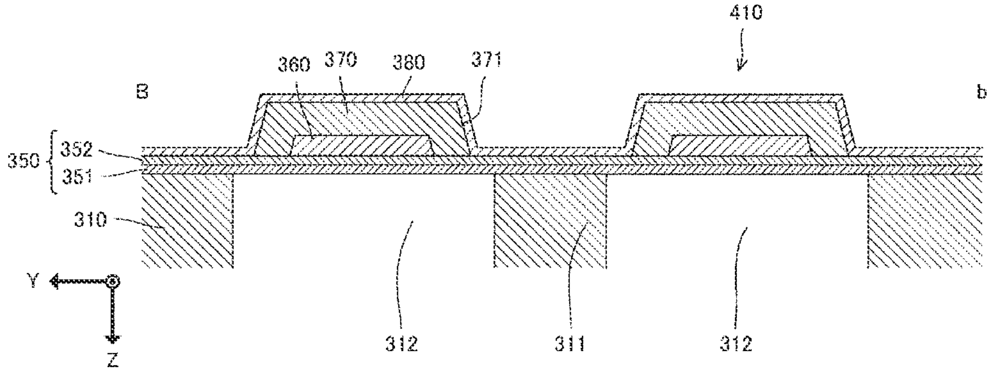
FIG. 6 is a cross-sectional view illustrating a B-b cross-section illustrated in FIG. 3.

Next, an example of a structure of the print head 22 provided in the head unit 20 will be described. FIG. 2 is an exploded perspective view illustrating the structure of the print head 22. FIG. 3 is a plan view of the print head 22 when viewed along the Z axis. FIG. 4 is a cross-sectional view an illustrating A-a cross-section illustrated in FIG. 3. FIG. 5 is a detailed main-part view illustrating details of main parts in FIG. 4. FIG. 6 is a cross-sectional view illustrating a B-b cross-section illustrated in FIG. 3.

As illustrated in FIG. 2, the print head 22 includes a pressure chamber substrate 310, a communication plate 315, a nozzle plate 320, a compliance substrate 345, a vibration plate 350 to be described later, piezoelectric elements 60 to be described later, a protective substrate 330, a case member 340, and a wiring substrate 420.

The pressure chamber substrate 310 is implemented by, for example, a silicon substrate, a glass substrate, an SOI substrate, various ceramic substrates, or the like. As illustrated in FIG. 3, in the pressure chamber substrate 310, two pressure chamber rows in which plurality of pressure chambers 312 are arranged in parallel along the Y axis are disposed along the X axis. Here, in the two pressure chamber rows, the pressure chamber row located on the +X side may be referred to as a first pressure chamber row, and the pressure chamber row located on the −X side of the first pressure chamber row may be referred to as a second pressure chamber row. FIG. 3 is a plan view of the print head 22 when viewed along the Z axis. A peripheral configuration of the pressure chamber substrate 310 is illustrated, and the protective substrate 330, the case member 340, and the like are not illustrated.

The plurality of pressure chambers 312 constituting each pressure chamber row are disposed at a straight line along the Y axis such that positions of the pressure chambers 312 along the X axis are the same. The pressure chambers 312 adjacent to each other along the Y axis are partitioned by a partition wall 311 illustrated in FIG. 6. Of course, the arrangement of the pressure chambers 312 is not particularly limited, and for example, the arrangement of the plurality of pressure chambers 312 arranged in parallel along the Y axis may be a so-called staggered arrangement in which the pressure chambers 312 are located to be shifted alternately in the direction along the X axis.

The pressure chamber 312 according to the embodiment is formed in a so-called rectangular shape in which the length in the direction along the X axis is larger than the length in the direction along the Y axis in a plan view seen from the +Z side. Of course, a shape of the pressure chamber 312 in the plan view from the +Z side is not limited to a rectangular shape, and may be a parallel quadrilateral shape, a polygonal shape, a circular shape, an oval shape, or the like. Here, an oval shape refers to a shape in which both end portions in a longitudinal direction are semicircular shapes based on a rectangular shape, and includes a rounded rectangular shape, an elliptical shape, an egg shape, and the like.

As illustrated in FIG. 2, the communication plate 315, the nozzle plate 320, and the compliance substrate 345 are stacked on the +Z side of the pressure chamber substrate 310.

As illustrated in FIGS. 2, 4, and 5, the communication plate 315 is provided with a nozzle communication path 316 that communicates the pressure chamber 312 with a nozzle 321. The communication plate 315 is further provided with a first manifold portion 317 and a second manifold portion 318 that constitute a part of a manifold 400 serving as a common liquid chamber communicating with the plurality of pressure chambers 312. The first manifold portion 317 is provided to penetrate the communication plate 315 in the direction along the Z axis. The second manifold portion 318 is provided to be opened in a +Z side surface without penetrating the communication plate 315 in the direction along the Z axis.

The communication plate 315 is further provided with a supply communication path 319 that communicates with one end portion of the pressure chamber 312 in the direction along the X axis and is independently provided in each of the pressure chambers 312. The supply communication path 319 communicates the second manifold portion 318 with each pressure chamber 312, and supplies ink in the manifold 400 to each pressure chamber 312.

Examples of the communication plate 315 include a silicon substrate, a glass substrate, an SOI substrate, various ceramic substrates, and a metal substrate. Examples of the metal substrate include a stainless steel substrate. The communication plate 315 may be formed of a material having a coefficient of thermal expansion substantially equal to that of the pressure chamber substrate 310. Accordingly, even when a change in temperature occurs in the pressure chamber substrate 310 and the communication plate 315, it is possible to reduce a possibility that the pressure chamber substrate 310 and the communication plate 315 warp due to a difference in coefficient of thermal expansion.

The nozzle plate 320 is provided on an opposite side of the communication plate 315 from the pressure chamber substrate 310, that is, at a +Z side surface. The nozzle plate 320 is formed with the nozzle 321 that communicates with each pressure chamber 312 via the nozzle communication path 316.

In the embodiment, the print head 22 includes a plurality of the nozzles 321, and the plurality of nozzles 321 are arranged in parallel along a Y axis direction. Specifically, in the nozzle plate 320, two nozzle rows in which the plurality of nozzles 321 are arranged are provided separated from each other in the direction along the X axis. The two nozzle rows correspond to the first pressure chamber row and the second pressure chamber row, respectively. The plurality of nozzles 321 in each row are disposed such that positions thereof in the direction along the X axis are the same. The arrangement of the nozzles 321 is not particularly limited, and for example, the nozzles 321 arranged in parallel in the direction along the Y axis may be disposed at positions shifted from one another in an X axis direction.

A material of the nozzle plate 320 is not particularly limited, and examples thereof include a silicon substrate, a glass substrate, an SOI substrate, various ceramic substrates, and a metal substrate. Examples of the metal substrate include a stainless steel substrate. Further, the material of the nozzle plate 320 may be an organic substance such as a polyimide resin. However, the material of the nozzle plate 320 may use a material having a coefficient of thermal expansion substantially equal to that of the communication plate 315. Accordingly, even when a change in temperature occurs in the nozzle plate 320 and the communication plate 315, it is possible to reduce a possibility that the nozzle plate 320 and the communication plate 315 warp due to a difference in coefficient of thermal expansion.

The compliance substrate 345, together with the nozzle plate 320, is provided on an opposite side of the communication plate 315 from the pressure chamber substrate 310, that is, at a +Z side surface. The compliance substrate 345 is provided around the nozzle plate 320, and seals the openings of the first manifold portion 317 and the second manifold portion 318 which are provided in the communication plate 315. The compliance substrate 345 includes a sealing film 346 formed of a flexible thin film and a fixing substrate 347 formed of a hard material such as a metal. A region of the fixing substrate 347 facing the manifold 400 is an opening 348 that is completely removed in a thickness direction. Therefore, one surface of the manifold 400 is a compliance portion 349 sealed only by the flexible sealing film 346.

In contrast, on an opposite side of the pressure chamber substrate 310 from the nozzle plate 320 and the like, that is, at a −Z side surface, the vibration plate 350 and the piezoelectric element 60 that causes a pressure change in the ink inside the pressure chamber 312 by bending and deforming the vibration plate 350 are stacked. In other words, the vibration plate 350 is provided on the +Z side in the direction along the Z axis with respect to the piezoelectric element 60, and the pressure chamber substrate 310 is provided on the +Z side in the direction along the Z axis with respect to the vibration plate 350. FIG. 4 is a view illustrating an overall configuration of the print head 22, and a configuration of the piezoelectric element 60 is simplified.

Further, the protective substrate 330 having substantially the same size as the pressure chamber substrate 310 is bonded to the −Z side surface of the pressure chamber substrate 310 by an adhesive or the like. The protective substrate 330 has holding portions 331 each being a space for protecting the piezoelectric element 60. The holding portion 331 is a space provided independently for each row of the piezoelectric elements 60 arranged in parallel in the direction along the Y axis, and there are two holding portions 331 formed in parallel in the direction along the X axis. The protective substrate 330 is provided with a through hole 332 penetrating in the direction along the Z axis between the two holding portions 331 arranged in parallel in the direction along the X axis.

Further, the case member 340, which defines the manifold 400 that communicates with the plurality of pressure chambers 312 together with the pressure chamber substrate 310, is fixed to the protective substrate 330. The case member 340 has substantially the same shape as the above-described communication plate 315 in a plan view from the −Z side, and is bonded to the protective substrate 330 and also to the above-described communication plate 315.

Such a case member 340 has, on a protective substrate 330 side, an accommodating portion 341 that is a space having a depth capable of accommodating the pressure chamber substrate 310 and the protective substrate 330. The accommodating portion 341 has an opening area larger than that of a surface of the protective substrate 330 bonded to the pressure chamber substrate 310. In a state in which the pressure chamber substrate 310 and the protective substrate 330 are accommodated in the accommodating portion 341, an opening surface of the accommodating portion 341 on a nozzle plate 320 side is sealed by the communication plate 315.

Further, in the case member 340, a third manifold portion 342 is defined on each of both outer sides of the accommodating portion 341 in the direction along the X axis. The manifold 400 is implemented by the first manifold portion 317 and the second manifold portion 318 which are provided at the communication plate 315 and the third manifold portion 342. The manifold 400 is provided continuously in the direction along the Y axis, and the supply communication paths 319 that communicate the pressure chambers 312 with the manifold 400 are arranged in parallel in the direction along the Y axis.

The case member 340 is provided with supply ports 344 each communicating with the manifold 400 and supplying the ink to each manifold 400. The case member 340 is further provided with a connection port 343 that communicates with the through hole 332 of the protective substrate 330 and through which the wiring substrate 420 is inserted.

Such a print head 22 takes in the ink stored in the ink container 90 from the supply ports 344. Then, after an inside from the manifold 400 to the nozzle 321 is filled with the ink, a signal based on the drive signal COM is supplied from an integrated circuit 421 to each of the piezoelectric elements 60 corresponding to the pressure chambers 312. Accordingly, the vibration plate 350 is deflected and deformed together with the piezoelectric element 60, the pressure in each pressure chamber 312 is increased, and the ink is dispensed from each nozzle 321.

Next, a configuration in which components including the vibration plate 350 and the piezoelectric element 60 described above are stacked and formed at the −Z side of the pressure chamber substrate 310 will be described. As the configuration stacked on the −Z side of the pressure chamber substrate 310, the print head 22 includes individual lead electrodes common lead electrodes 392, a measurement lead electrode 393, and a resistance wiring 401 in addition to the vibration plate 350 and the piezoelectric element 60.

As illustrated in FIGS. 4 to 6, the vibration plate 350 includes an elastic film 351 formed of silicon oxide and provided on a pressure chamber substrate 310 side and an insulator film 352 formed of a zirconium oxide film and provided on the elastic film 351. A liquid flow path of the pressure chamber 312 and the like is formed by anisotropic etching the pressure chamber substrate 310 from the +Z side surface, and a −Z side surface of the liquid flow path of the pressure chamber 312 and the like is implemented by the elastic film 351. A configuration of the vibration plate 350 is not particularly limited. For example, the vibration plate 350 may be implemented by one of the elastic film 351 and the insulator film 352, and may further include a film other than the elastic film 351 and the insulator film 352. Here, examples of a material of another film constituting the vibration plate 350 include silicon and silicon nitride.

The piezoelectric element 60 functions as a piezoelectric actuator that causes a pressure change in the ink in the pressure chamber 312. The piezoelectric element 60 includes an electrode 360, a piezoelectric body 370, and an electrode 380 that are sequentially stacked from the +Z side which is a vibration plate 350 side toward the −Z side. In other words, the piezoelectric element 60 includes the electrode 360, the electrode 380, and the piezoelectric body 370, and the piezoelectric body 370 is provided between the electrode 360 and the electrode 380 in the direction along the Z axis in which the electrode 360, the electrode 380, and the piezoelectric body 370 are stacked.

Both the electrode 360 and the electrode 380 are electrically coupled to the wiring substrate 420. The signal supplied from the integrated circuit 421 mounted at the wiring substrate 420 is supplied to the electrode 360, and a reference potential signal propagating through the wiring substrate 420 is supplied to the electrode 380, thereby supplying the signal supplied from the integrated circuit 421 and the reference potential signal to the piezoelectric body 370. Then, the piezoelectric body 370 is deformed due to a potential difference generated between the electrode 360 and the electrode 380. The deformation of the piezoelectric body 370 causes the vibration plate 350 to deform or vibrate, and the deformation of the vibration plate 350 causes a volume of the pressure chamber 312 to change. Then, a change in pressure caused by a change in volume of the pressure chamber 312 is applied to the ink stored in the pressure chamber 312, and the ink stored in the pressure chamber 312 is dispensed from the nozzle 321 via the nozzle communication path 316. At this time, a dispensing amount of the ink dispensed from the nozzle 321 is a volume change amount of the pressure chamber 312.

Here, in the following description, in the piezoelectric element 60 when a voltage is applied between the electrode 360 and the electrode 380, a portion of the piezoelectric body 370 where a piezoelectric strain occurs is referred to as an active portion 410, and a portion of the piezoelectric body 370 where the piezoelectric strain does not occur is referred to as a non-active portion 415. That is, in the piezoelectric element 60, a portion of the piezoelectric body 370 that is sandwiched between the electrode 360 and the electrode 380 corresponds to the active portion 410, and a portion of the piezoelectric body 370 that is not sandwiched between the electrode 360 and the electrode 380 corresponds to the non-active portion 415. Further, when the piezoelectric element 60 is driven, a portion displaced in the direction along the Z axis is referred to as a flexible portion, and a portion not displaced in the direction along the Z axis is referred to as a non-flexible portion. That is, in the piezoelectric element 60, a portion of the piezoelectric element 60 facing the pressure chamber 312 in the direction along the Z axis corresponds to the flexible portion, and an outer portion of the pressure chamber 312 corresponds to the non-flexible portion. The active portion 410 may be referred to as an activity portion, and the non-active portion 415 may be referred to as a non-activity portion.

In general, one of electrodes of the active portion 410 is implemented as an individual electrode that is independent for each active portion 410, and the other electrode is implemented as a common electrode common to a plurality of the active portions 410. In the embodiment, the electrode 360 to which the signal output from the integrated circuit 421 is supplied is implemented as the individual electrode, and the electrode 380 to which the reference potential signal propagating through the wiring substrate 420 is supplied is implemented as the common electrode.

Specifically, the electrode 360 is provided on the +Z side with respect to the piezoelectric body 370, and is divided into the individual electrode for each pressure chamber 312 and independent for each active portion 410. That is, the electrode 360 is individually provided for the plurality of pressure chambers 312. The electrode 360 is formed with a width less than a width of the pressure chamber 312 in the direction along the Y axis. That is, in the direction along the Y axis, an end portion of the electrode 360 is located inside a region facing the pressure chamber 312.

Further, an end portion 360*a* of the electrode 360 on the +X side and an end portion 360*b* of the electrode 360 on the −X side are disposed outside the pressure chamber 312. For example, in the first pressure chamber row, as illustrated in FIG. 5, the end portion 360*a* of the electrode 360 is disposed on the +X side relative to an end portion 312*a* of the pressure chamber 312 on the +X side. The end portion 360*b* of the electrode 360 is disposed on the −X side relative to an end portion 312*b* of the pressure chamber 312 on the −X side.

A material of the electrode 360 is not particularly limited, and examples thereof include a conductive material such as a metal such as platinum (Pt), iridium (Ir), gold (Au), or titanium (Ti), or a conductive metal oxide such as an indium tin oxide abbreviated as ITO. Alternatively, a plurality of materials such as platinum (Pt), iridium (Ir), gold (Au), and titanium (Ti) may be stacked to from the electrode. In the embodiment, platinum (Pt) is used as the electrode 360.

As illustrated in FIG. 3, the piezoelectric body 370 has the length in the direction along the X axis as a predetermined length and is continuously provided over the direction along the Y axis. That is, the piezoelectric body 370 is provided continuously along an arrangement direction of the pressure chambers 312 with a predetermined thickness. The thickness of the piezoelectric body 370 is not particularly limited, and the piezoelectric body 370 is formed with a thickness of about 1000 nanometers to 4000 nanometers.

As illustrated in FIG. 5, the length of the piezoelectric body 370 in the direction along the X axis is larger than the length of the pressure chamber 312 in the direction along the X axis which is a longitudinal direction. Therefore, on both sides of the pressure chamber 312 in the direction along the X axis, the piezoelectric body 370 extends to an outside of the pressure chamber 312. In this way, since the piezoelectric body 370 extends to the outside of the pressure chamber 312 in the direction along the X axis, the strength of the vibration plate 350 is improved. Therefore, when the active portion 410 is driven to displace the piezoelectric element 60, it is possible to reduce a possibility that cracks or the like occur in the vibration plate 350 or the piezoelectric element 60.

Further, for example, in the first pressure chamber row, as illustrated in FIG. 5, an end portion 370*a* of the piezoelectric body 370 on the +X side is located on the +X side which is outside the end portion 360*a* of the electrode 360. That is, the end portion 360*a* of the electrode 360 is covered with the piezoelectric body 370. In contrast, an end portion 370*b* of the piezoelectric body 370 on the −X side is located on the +X side which is further inward relative to the end portion 360*b* of the electrode 360, and the end portion 360*b* of the electrode 360 is not covered with the piezoelectric body 370.

In the piezoelectric body 370, as illustrated in FIGS. 3 and 6, a groove portion 371 that is a portion thinner than other regions is formed corresponding to each partition wall 311. The groove portion 371 according to the embodiment is formed by completely removing the piezoelectric body 370 in the direction along the Z axis. That is, the expression that the piezoelectric body 370 has a portion thinner than other regions includes a case where the piezoelectric body 370 is completely removed in the direction along the Z axis. Of course, the piezoelectric body 370 may be formed thinner than other portions on a base surface of the groove portion 371.

The length of the groove portion 371 in the direction along the Y axis, that is, the width of the groove portion 371 is equal to or larger than the width of the partition wall 311. In the embodiment, the width of the groove portion 371 is larger than the width of the partition wall 311. In this way, the groove portion 371 is formed in a rectangular shape in the plan view from the −Z side. Of course, a shape of the groove portion 371 in the plan view from the −Z side is not limited to a rectangular shape, and may be a polygonal shape having five or more sides, a circular shape, an elliptical shape, or the like.

By providing the groove portion 371 in the piezoelectric body 370, the rigidity of a portion of the vibration plate 350 facing the end portion of the pressure chamber 312 in the direction along the Y axis, that is, an arm portion of the vibration plate 350 is reduced, and therefore the piezoelectric element 60 can be displaced more favorably.

Examples of the piezoelectric body 370 include a crystal film having a perovskite structure that is formed at the electrode 360 and is formed of a ferroelectric ceramic material exhibiting an electromechanical conversion effect, that is, a so-called perovskite crystal. Examples of a material of the piezoelectric body 370 include a ferroelectric piezoelectric material such as lead zirconate titanate (PZT) and a material obtained by adding a metal oxide such as a niobium oxide, a nickel oxide, or a magnesium oxide to the ferroelectric piezoelectric material. Specifically, lead titanate ($PbTiO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate $(Pb,La)(Zr,Ti)O_3$), lead magnesium niobate zirconium titanate ($Pb(Zr,Ti)(Mg,Nb)O_3$), or the like can be used. In the embodiment, lead zirconate titanate (PZT) is used as the piezoelectric body 370.

The material of the piezoelectric body 370 is not limited to a lead-based piezoelectric material containing lead, and a lead-free piezoelectric material containing no lead may be used. Examples of the lead-free piezoelectric material include bismuth ferrate (($BiFeO_3$), abbreviated as "BFO"), barium titanate (($BaTiO_3$), abbreviated as "BT"), potassium sodium niobate (($(K,Na)(NbO_3)$), abbreviated as "KNN"), lithium potassium sodium niobate (($(K,Na,Li)(NbO_3)$)), lithium potassium niobate sodium tantalate (($(K,Na,Li)(Nb,Ta)O_3$), bismuth potassium titanate (($(Bi1/2K1/2)TiO_3$, abbreviated as "BKT"), bismuth sodium titanate (($(Bi1/2Na1/2)TiO_3$, abbreviated as "BNT"), bismuth manganate ($BiMnO_3$, abbreviated as "BM"), a composite oxide having a perovskite structure containing bismuth, potassium, titanium, and iron ($x[(BixK1-x)TiO_3]$—$(1-x)[BiFeO_3]$, abbreviated as "BKT-BF"), a composite oxide having a perovskite structure containing bismuth, iron, barium, and titanium (($(1-x)[BiFeO_3]-x[BaTiO_3]$, abbreviated as "BFO-BT"), and a material obtained by adding a metal such as manganese, cobalt, and chromium thereto (($(1-x)[Bi(Fe1-yMy)O_3]-x[BaTiO_3]$ (M is Mn, Co, or Cr)).

As illustrated in FIGS. 3, 5, and 6, the electrode 380 is provided on the −Z side which is an opposite side of the electrode 360 about the piezoelectric body 370, and constitutes the common electrode common to the plurality of active portions 410. That is, the electrode 380 is provided in common to the plurality of pressure chambers 312. The electrode 380 has the length in the direction along the X axis as a predetermined length and is continuously provided over the direction along the Y axis. The electrode 380 is also provided at an inner surface of the groove portion 371, that is, on a side surface of the groove portion 371 of the piezoelectric body 370 and on the insulator film 352 which is the base surface of the groove portion 371. Regarding an inside of the groove portion 371, the electrode 380 may be provided only at a part of the inner surface of the groove portion 371, or may not be provided over the entire inner surface of the groove portion 371.

Further, for example, in the first pressure chamber row, as illustrated in FIG. 5, an end portion 380*a* of the electrode 380 on the +X side is disposed on the +X side to be outside the end portion 360*a* of the electrode 360 covered with the piezoelectric body 370. That is, the end portion 380*a* of the electrode 380 is located on the +X side which is outside the end portion 312*a* of the pressure chamber 312, and on the +X side which is outside the end portion 360*a* of the electrode 360. In the embodiment, the end portion 380*a* of the electrode 380 substantially coincides with the end portion 370*a* of the piezoelectric body 370 in the direction along the X axis. Therefore, an end portion of the active portion 410 on the +X side, that is, a boundary between the active portion 410 and the non-active portion 415 is defined by the end portion 360*a* of the electrode 360.

In contrast, an end portion 380*b* of the electrode 380 on the −X side is disposed on the −X side which is outside the end portion 312*b* of the pressure chamber 312 on the −X side and on the +X side which is inside the end portion 370*b* of the piezoelectric body 370. As described above, the end portion 370*b* of the piezoelectric body 370 is located inside the end portion 360*b* of the electrode 360 on the +X side. Therefore, the end portion 380*b* of the electrode 380 is located on the piezoelectric body 370 on the +X side relative to the end portion 360*b* of the electrode 360. Therefore, there is a portion where a surface of the piezoelectric body 370 is exposed on the −X side relative to the end portion 380*b* of the electrode 380.

In this way, the end portion 380*b* of the electrode 380 is disposed on the +X side relative to the end portion 370*b* of the piezoelectric body 370 and the end portion 360*b* of the electrode 360. Therefore, an end portion of the active portion 410 on the −X side, that is, a boundary between the active portion 410 and the non-active portion 415 is defined by the end portion 380*b* of the electrode 380.

A material of the electrode 380 is not particularly limited, and similarly to the electrode 360, examples thereof include a conductive material such as a metal such as platinum (Pt), iridium (Ir), gold (Au), or titanium (Ti), or a conductive metal oxide such as an indium tin oxide abbreviated as ITO. Alternatively, a plurality of materials such as platinum (Pt), iridium (Ir), gold (Au), and titanium (Ti) may be stacked to form the electrode. In the embodiment, iridium (Ir) is used as the electrode 380.

Further, a wiring portion 385 that is the same layer as the electrode 380 but is electrically discontinuous with the electrode 380 is provided outside the end portion 380*b* of the electrode 380, that is, on the −X side relative to the end portion 380*b* of the electrode 380. The wiring portion 385 is formed over the electrode 360 extending from the piezoelectric body 370 to the −X side relative to the piezoelectric body 370 in a state of being spaced apart so as not to be in contact with the end portion 380*b* of the electrode 380. The wiring portion 385: provided independently for each active portion 410. That is, a plurality of the wiring portions 385 are disposed at predetermined intervals in the direction along the Y axis. The wiring portion 385 may be formed in a layer different from the electrode 380, but is preferably formed at the same layer as the electrode 380. Accordingly, a manufacturing process of the wiring portion 385 can be simplified and the cost can be reduced.

In the electrode 360 and the electrode 380 constituting the piezoelectric element 60, the individual lead electrode 391 is coupled to the electrode 360, and the common lead electrode 392 which is a common electrode for driving is electrically coupled to the electrode 380. The flexible wiring substrate 420 is electrically coupled to end portions of the individual lead electrode 391 and the common lead electrode 392 on the opposite side from an end portion coupled to the piezoelectric element 60. A plurality of wirings for connecting the control unit 10, a temperature information output circuit 26, and a plurality of circuits (not illustrated) are formed in the wiring substrate 420. In the embodiment, the wiring substrate 420 is implemented by, for example, a flexible printed circuit (FPC). Instead of the FPC, any flexible substrate such as a flexible flat cable (FFC) may be used.

In the embodiment, the individual lead electrode 391 and the common lead electrode 392 extend to be exposed in the through hole 332 formed in the protective substrate 330, and are electrically coupled to the wiring substrate 420 in the through hole 332. The integrated circuit 421 that outputs a signal for driving the piezoelectric element 60 is mounted at the wiring substrate 420.

In the embodiment, the individual lead electrode 391 and the common lead electrode 392 are formed in the same layer, but are formed to be electrically discontinuous. Accordingly, the manufacturing process can be simplified and the cost can be reduced as compared with a case where the individual lead electrode 391 and the common lead electrode 392 are individually formed. Of course, the individual lead electrode 391 and the common lead electrode 392 may be formed in different layers.

Materials of the individual lead electrode 391 and the common lead electrode 392 are not particularly limited as long as having conductivity, and examples thereof include gold (Au), copper (Cu), titanium (Ti), tungsten (W), nickel (Ni), chromium (Cr), platinum (Pt), and aluminum (Al). In the embodiment, gold (Au) is used as the individual lead electrode 391 and the common lead electrode 392. Further, the individual lead electrode 391 and the common lead electrode 392 may include an adhesion layer for improving adhesion to the electrode 360, the electrode 380, and the vibration plate 350.

The individual lead electrode 391 is provided for each active portion 410, that is, for each electrode 360. As illustrated in FIG. 5, for example, in the first pressure chamber row, the individual lead electrode 391 is coupled, via the wiring portion 385, to the vicinity of the end portion 360*b* of the electrode 360 provided on an outside of the piezoelectric body 370, and is led out above the vibration plate 350, actually in the direction along-X to above the pressure chamber substrate 310.

In contrast, as illustrated in FIG. 3, for example, in the first pressure chamber row, the common lead electrode 392 is led out to the −X side from above the electrode 380 constituting the common electrode above the piezoelectric body 370 to above the vibration plate 350 at both end portions in the direction along the Y axis. The common lead electrode 392 includes an extension portion 392*a* and an extension portion 392*b*. As illustrated in FIGS. 3 and 5, for example, in the first pressure chamber row, the extension portion 392*a* extends in the direction along the Y axis in a region corresponding to the end portion 312*a* of the pressure chamber 312, and the extension portion 392*b* extends in the direction along the Y axis in a region corresponding to the end portion 312*b* of the pressure chamber 312. The extension portion 392*a* and the extension portion 392*b* are provided continuously with respect to the plurality of active portions 410 over the direction along the Y axis.

The extension portion 392*a* and the extension portion 392*b* extend from an inside of the pressure chamber 312 to an outside of the pressure chamber 312 in the direction along the X axis. In the embodiment, the active portion 410 of the piezoelectric element 60 extends to the outside of the pressure chamber 312 at both end portions of the pressure chamber 312 in the direction along the X axis, and the extension portion 392*a* and the extension portion 392*b* extend to the outside of the pressure chamber 312 above the active portion 410.

As illustrated in FIG. 5, the resistance wiring 401 is provided at a −Z side surface of the vibration plate 350. The resistance wiring 401 detects the temperature of the pressure chamber 312 by using a characteristic that an electrical resistance value of the resistance wiring 401 changes depending on the temperature. Examples of a material of such a resistance wiring 401 include gold (Au), platinum (Pt), iridium (Ir), aluminum (Al), copper (Cu), titanium (Ti), tungsten (W), nickel (Ni), and chromium (Cr), as a material whose electrical resistance value is temperature-dependent. Among these materials, platinum (Pt) has a large change in resistance value due to temperature and has high stability and accuracy. Further, platinum (Pt) has high linearity of a change in resistance value with respect to a temperature change. From this viewpoint, platinum (Pt) may be used as the material of the resistance wiring 401. That is, the resistance wiring 401 may contain platinum (Pt). In the embodiment, the resistance wiring 401 is formed in the same layer as the electrode 360, and is stacked and formed at the −Z side surface of the vibration plate 350 to be electrically discontinuous with the electrode 360. That is, the resistance wiring 401 includes a wiring pattern stacked on the −Z side surface of the vibration plate 350 in the direction along the Z axis, and the wiring pattern contains platinum (Pt).

As illustrated in FIG. 3, one end of the resistance wiring 401 is coupled to a measurement lead electrode 393*a*, and the other end of the resistance wiring 401 is coupled to a measurement lead electrode 393*b*. The measurement lead electrodes 393*a* and 393*b* are electrically coupled to the wiring substrate 420. Accordingly, a signal of a voltage value according to the electrical resistance value that changes depending on the temperature of the pressure chamber 312 that is detected by the resistance wiring 401 is output from the print head 22. In the embodiment, the resistance wiring 401 is covered with the piezoelectric body 370, and is located between the vibration plate 350 and the piezoelectric body 370 in the direction along the Z axis.

The resistance wiring 401 includes a first pressure chamber row side meandering pattern located on the +X side in the direction along the X axis and a second pressure chamber row side meandering pattern located on the −X side in the direction along the X axis. When viewed from the −Z side, the first pressure chamber row side meandering pattern is located to overlap the supply communication path 319 communicating each with pressure chamber 312 constituting the first pressure chamber row, and meanders in the direction along the Y axis. When viewed from the −Z side, the second pressure chamber row side meandering pattern is located to overlap the supply communication path 319 communicating with each pressure chamber 312 constituting the second pressure chamber row, and meanders in the direction along the Y axis. That is, the resistance wiring 401 includes the first pressure chamber row side meandering pattern corresponding to the first pressure chamber row formed by the plurality of pressure chambers 312, and the second pressure chamber row side meandering pattern corresponding to the second pressure chamber row formed by the plurality of pressure chambers 312.

As illustrated in FIGS. 4 and 5, a distance between an end portion of the pressure chamber 312 on the −Z side and the resistance wiring 401 in the direction along the Z axis is smaller than a dimension of the pressure chamber 312 in the direction along the Z axis. Further, for example, in the first pressure chamber row, a largest distance between the end portion 312*a* of the pressure chamber 312 on the +X side and the resistance wiring 401 in the direction along the X axis is smaller than a dimension of the pressure chamber 312 in the direction along the X axis. Therefore, the electrical resistance value of the resistance wiring 401 easily changes according to the temperature change of the pressure chamber 312.

In the embodiment, the measurement lead electrode 393 including the measurement lead electrode 393*a* and the measurement lead electrode 393*b* is formed in the same layer as the individual lead electrode 391 and the common lead electrode 392, but is formed to be electrically discontinuous. Accordingly, the manufacturing process can be simplified and the cost can be reduced as compared with a case where the measurement lead electrode 393 is formed separately from the individual lead electrode 391 and the common lead electrode 392. Of course, the measurement lead electrode 393 may be formed in a layer different from that of the individual lead electrode 391 and the common lead electrode 392.

A material of the measurement lead electrode 393 is not particularly limited as long as having conductivity, and examples thereof include gold (Au), copper (Cu), titanium (Ti), tungsten (W), nickel (Ni), chromium (Cr), platinum (Pt), and aluminum (Al). In the embodiment, gold (Au) is used as the measurement lead electrode 393. Therefore, the material of the measurement lead electrode 393 is the same as those of the individual lead electrode 391 and the common lead electrode 392. Further, the measurement lead electrode 393 may include an adhesion layer for improving adhesion to the resistance wiring 401 and the vibration plate 350.

In this way, in the embodiment, the measurement lead electrode 393 extends to be exposed in the through hole 332 formed in the protective substrate 330, and is electrically coupled to the wiring substrate 420 in the through hole 332. Accordingly, the electrical resistance value of the resistance wiring 401 that changes depending on the temperature of the pressure chamber 312 is output from the print head 22 via the wiring substrate 420.

That is, the print head 22 provided in the head unit 20 according to the embodiment includes the piezoelectric element 60 that includes the electrode 360, the electrode 380, and the piezoelectric body 370 located between the electrode 360 and the electrode 380 in the direction along the Z axis in which the electrode 360, the electrode 380, and the piezoelectric body 370 are stacked and is driven when receiving the drive signal COM, the vibration plate 350 located at the +Z side which is one side in the direction along the Z axis with respect to the piezoelectric element 60 and deformed when the piezoelectric element 60 is driven, the pressure chamber substrate 310 located at the +Z side which is one side of the direction along the Z axis with respect to the vibration plate 350 and provided with the pressure chamber 312 whose volume changes when the vibration plate 350 is deformed, the nozzle 321 that dispenses the ink according to a change in volume of the pressure chamber 312, and the resistance wiring 401 located at the −Z side which is the other side in the direction along the Z axis with respect to the vibration plate 350 and acquiring the temperature according to the temperature of the pressure chamber 312.

1.2 Functional Configuration of Liquid Dispensing Apparatus

Functional Configuration of Liquid Dispensing Apparatus

Figure 7:
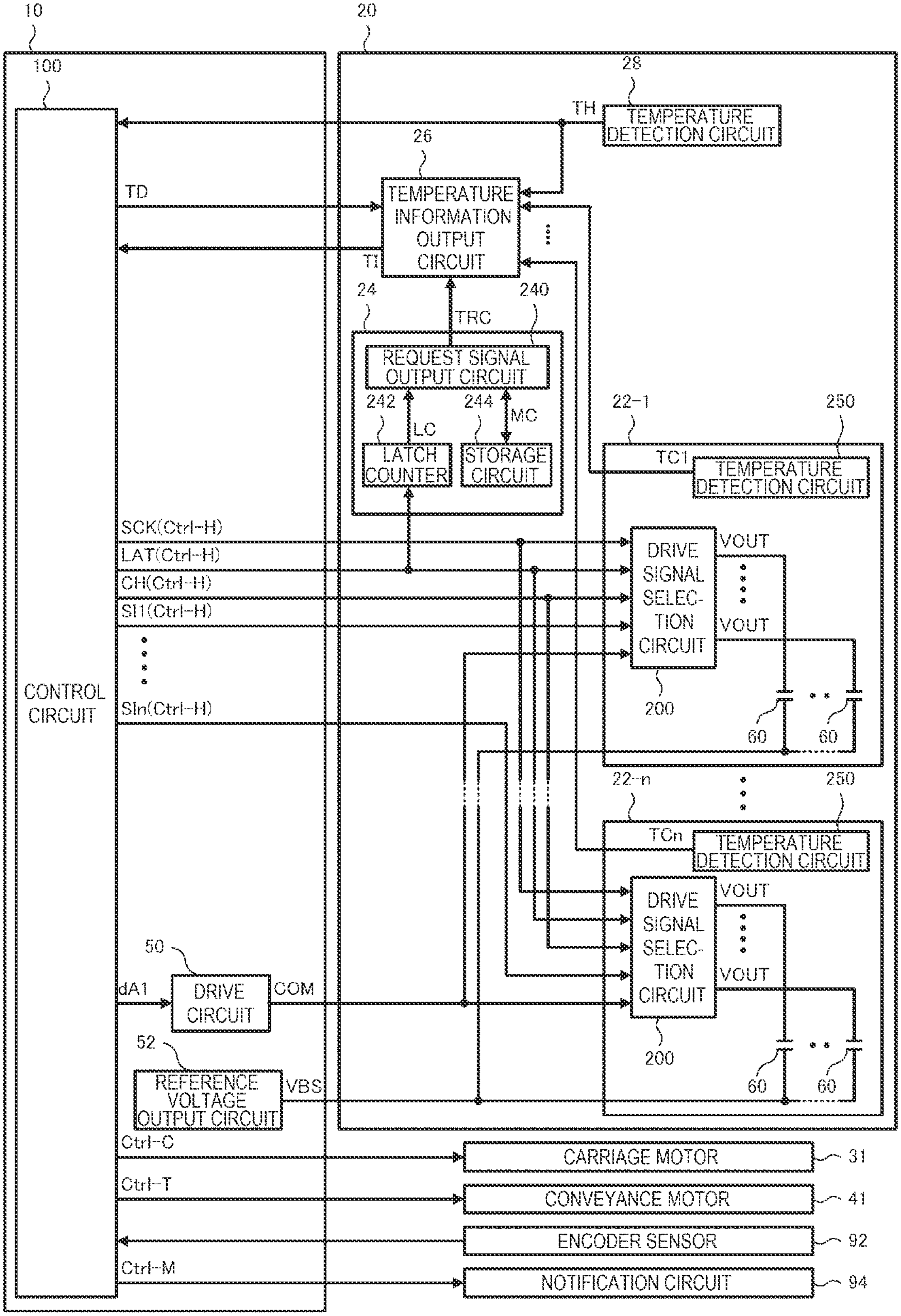
FIG. 7 is a diagram illustrating a functional configuration of the liquid dispensing apparatus.

Next, a functional configuration of the liquid dispensing apparatus 1 will be described. FIG. 7 is a diagram illustrating the functional configuration of the liquid dispensing apparatus 1. As illustrated in FIG. 7, the liquid dispensing apparatus 1 includes the control unit 10, the head unit 20, the carriage motor 31, the conveyance motor 41, an encoder sensor 92, and a notification circuit 94.

The control unit 10 includes a drive circuit 50, a reference voltage output circuit 52, and a control circuit 100. The control circuit 100 includes, for example, a processing circuit such as a CPU or an FPGA and a storage circuit such as a semiconductor memory. The control circuit 100 receives an image information signal including image data from an external device such as a host computer communicably connected to an outside of the liquid dispensing apparatus 1. The control circuit 100 generates various signals for controlling the liquid dispensing apparatus 1 based on the received image information signal, and outputs the generated signals to corresponding components.

In a specific example, in addition to the above-described image information signal, the control circuit 100 receives a detection signal based on a scanning position of the above-described carriage 21 provided in the head unit 20 from the encoder sensor 92. Accordingly, the control circuit 100 grasps the scanning position of the carriage 21, that is, a scanning position of the head unit 20 including the print head 22. The control circuit 100 generates various signals according to the received image information signal and the grasped scanning position of the head unit 20, and outputs the generated signals to corresponding components.

Specifically, the control circuit 100 generates the control signal Ctrl-C for controlling the movement of the head unit 20 along a scanning axis according to the scanning position of the head unit 20, and outputs the generated control signal Ctrl-C to the carriage motor 31. Accordingly, the carriage motor 31 operates to control the movement of the head unit 20 mounted at the carriage 21 along the scanning axis and the scanning position. The control circuit 100 also generates the control signal Ctrl-T for controlling the conveyance of the medium P, and outputs the generated control signal Ctrl-T to the conveyance motor 41. Accordingly, the conveyance motor 41 operates to control the movement of the medium P along the conveyance direction. The control signal Ctrl-C may be converted through a driver circuit (not illustrated) and then input to the carriage motor 31, and the control signal Ctrl-T may be converted through a driver circuit (not illustrated) and then input to the conveyance motor 41.

The control circuit 100 generates print data signals SI1 to SIn, a change signal CH, a latch signal LAT, and a clock signal SCK as the control signal Ctrl-H for controlling the head unit 20 based on the image information signal received from the external device and the scanning position of the head unit 20, and outputs the generated print data signals SI1 to SIn, change signal CH, latch signal LAT, and clock signal SCK to the head unit 20.

Further, the control circuit 100 generates a temperature acquisition request signal TD for acquiring a temperature of the head unit 20 at a predetermined timing, and outputs the generated temperature acquisition request signal TD to the head unit 20. Accordingly, the control circuit 100 receives a temperature information signal TI including the temperature of the head unit 20 according to the temperature acquisition request signal TD. The control circuit 100 grasps a state of the head unit 20 based on the received temperature information signal TI, corrects the control signals Ctrl-H, Ctrl-C, and Ctrl-T, and outputs the corrected control signals to the corresponding components. Accordingly, the operations of the liquid dispensing apparatus 1 and the head unit 20 are controlled according to the temperature information signal TI which is a temperature of the print head 22. As a result, dispensing accuracy of the ink dispensed from the liquid dispensing apparatus 1 and the head unit 20 is improved.

The control circuit 100 generates a base drive signal dA1 that is a digital signal as the control signal Ctrl-H, and outputs the generated base drive signal dA1 to the drive circuit 50. The drive circuit 50 generates the drive signal COM having a signal waveform defined by the base drive signal dA1 as the drive signal COM, and outputs the generated drive signal COM to the head unit 20.

Specifically, the base drive signal dA1 output from the control circuit 100 is input to the drive circuit 50. The drive circuit 50 performs digital/analog signal conversion on the received base drive signal dA1, performs class D amplification on the analog signal obtained by the conversion to generate the drive signal COM, and outputs the generated drive signal COM to the head unit 20. That is, the control circuit 100 outputs the base drive signal dA1 as the control signal Ctrl-H corrected based on the temperature information signal TI, and the drive circuit 50 outputs the corrected drive signal COM according to the base drive signal dA1 corrected based on the temperature information signal TI. Here, the base drive signal dA1 output from the control circuit 100 is a digital signal for defining the signal waveform of the drive signal COM, but the base drive signal dA1 may be an analog signal as long as the base drive signal dA1 can define the signal waveform of the drive signal COM. The drive circuit 50 may generate the drive signal COM by performing class A amplification, class B amplification, and class AB amplification on the signal waveform defined by the base drive signal dA1.

The reference voltage output circuit 52 generates a reference voltage signal VBS and outputs the generated reference voltage signal VBS to the head unit 20. The reference voltage signal VBS is a signal having a constant voltage value serving as a reference for driving the piezoelectric element 60, and is supplied to the electrode 380 which is the common electrode. The voltage value of such a reference voltage signal VBS may be, for example, a constant signal at a ground potential, or may be constant at a potential such as 5.5 V or 6 V.

Further, the control circuit 100 generates a control signal Ctrl-M for notifying a user of operation states of the drive circuit 50, the reference voltage output circuit 52, and the head unit 20, and outputs the generated control signal Ctrl-M to the notification circuit 94. Accordingly, an operation state of the liquid dispensing apparatus 1 is notified to the user.

The head unit 20 includes print heads 22-1 to **22-*n* as the plurality of print heads 22, a correction request signal output circuit 24, the temperature information output circuit 26, and a temperature detection circuit 28. Each of the print heads 22-1 to 22-*n* includes a drive signal selection circuit 200, a temperature detection circuit 250, and a plurality of the piezoelectric elements 60**.

The print head 22-1 receives the print data signal SI1, the change signal CH, the latch signal LAT, the clock signal SCK, the drive signal COM, and the reference voltage signal VBS which are output from the control circuit 100. The clock signal SCK, the latch signal LAT, the change signal CH, the print data signal SI1, and the drive signal COM received by the print head 22-1 are input to the drive signal selection circuit 200.

The drive signal selection circuit 200 selects or deselects the signal waveform included in the drive signal COM based on the received clock signal SCK, latch signal LAT, change signal CH, and print data signal SI1 to generate a drive signal VOUT corresponding to each of the plurality of piezoelectric elements 60. Then, the drive signal selection circuit 200 outputs the generated drive signal VOUT to the electrode 360 which is one end of the corresponding piezoelectric element 60 and is the individual electrode. At this time, the reference voltage signal VBS is commonly input to the electrodes 380 which are the other ends of the plurality of piezoelectric elements 60 and serve as the common electrode. Accordingly, each of the plurality of piezoelectric elements 60 is displaced by a potential difference between the drive signal VOUT received by the electrode 360 and the reference voltage signal VBS received by the electrode 380, and an amount of ink corresponding to the displacement of the piezoelectric element 60 is dispensed from the corresponding nozzle 321 provided in the print head 22-1. Here, at least a part of the drive signal selection circuit 200 may be mounted at the wiring substrate 420 of the print head 22-1 as the above-described integrated circuit 421.

The temperature detection circuit 250 provided in the print head 22-1 detects a temperature of the print head 22-1. Then, the temperature detection circuit 250 acquires head temperature information tc1 of a voltage value according to the detected temperature of the print head 22-1, and outputs a head temperature signal TC1 including the acquired head temperature information tc1 to the temperature information output circuit 26. Here, at least a part of the temperature detection circuit 250 provided in the print head 22-1 is provided in the print head 22-1 as the resistance wiring 401. That is, the head temperature information tc1 of the voltage value according to the temperature H the print head 22-1 output from the temperature detection circuit 250 includes information on a voltage value that changes according to the resistance value of the resistance wiring 401 that changes according to the temperature.

The print heads 22-2 to **22-*n* have the same configuration as that of the print head 22-1 except that a received signal and an output signal are different, and perform the same operation. Specifically, the print head 22-*i* (i is any one of 2 to n) receives the clock signal SCK, the latch signal LAT, the change signal CH, the print data signal SIi, the drive signal COM, and the reference voltage signal VBS. The drive signal selection circuit 200 provided in the print head 22-*i*** selects or deselects the signal waveform of the drive signal COM based on the received clock signal SCK, latch signal LAT, change signal CH, and print data signal SIi to generate the drive signal VOUT corresponding to each of the plurality of piezoelectric elements 60 and output the generated drive signal VOUT to the electrode 360 of the corresponding piezoelectric element 60. The reference voltage signal VBS is commonly input to the electrodes 380 of the plurality of piezoelectric elements 60 provided in the print head 22-*i*. Accordingly, the plurality of piezoelectric elements 60 provided in the print head 22-*i* are driven, and an amount of ink corresponding to the driving of the piezoelectric elements 60 is dispensed from the nozzles 321 provided in the print head 22-*i*.

The temperature detection circuit 250 provided in the print head 22-*i* acquires head temperature information tci of a voltage value according to a temperature of the print head 22-*i*, and outputs a head temperature signal TCi including the acquired head temperature information tci to the temperature information output circuit 26. Here, at least a part of the drive signal selection circuit 200 provided in the print head 22-*i* is mounted at the wiring substrate 420 of the print head 22-*i* as the above-described integrated circuit 421, and at least a part of the temperature detection circuit 250 provided in the print head 22-*i* is provided in the print head 22-*i* as the above-described resistance wiring 401.

Here, in the following description, a case will be described in which the print head 22 when there is no need to distinguish the print heads 22-1 to 22-*n* receives the clock signal SCK, the latch signal LAT, the change signal CH, a print data signal SI as the print data signals SI1 to SIn, the drive signal COM, and the reference voltage signal VBS. A case will be described in which the temperature detection circuit 250 of the print head 22 acquires the head temperature information tc as head temperature information tc1 to tcn of a voltage value according to the temperature of the print head 22, and the print head 22 outputs a head temperature signal TC as head temperature signals TC1 to TCn including the acquired head temperature information tc.

The temperature detection circuit 28 detects the temperature of the head unit 20 including the print heads 22-1 to 22-*n*. Then, the temperature detection circuit 28 generates a unit temperature signal TH including unit temperature information th of a voltage value according to the detected temperature. The temperature detection circuit 28 outputs the generated unit temperature signal TH to the temperature information output circuit 26 and the control circuit 100. Such a temperature detection circuit 28 includes a thermistor element and the like whose resistance value changes according to a temperature change of the head unit 20.

The temperature information output circuit 26 generates the temperature information signal TI according to the head temperature signals TC1 to TCn output from the print heads 22-1 to 22-*n*, the unit temperature signal TH output from the temperature detection circuit 28, and the temperature acquisition request signal TD output from the control circuit 100, and outputs the generated temperature information signal TI to the control circuit 100.

Specifically, the temperature information output circuit 26 amplifies the head temperature signals TC1 to TCn and selects the amplified head temperature signals TC1 to TCn according to the temperature acquisition request signal TD received from the control circuit 100. Then, the temperature information output circuit 26 generates the temperature information signal TI according to the selected amplified head temperature signals TC1 to TCn and outputs the generated temperature information signal TI to the control circuit 100. At this time, the temperature information output circuit 26 corrects the head temperature information tc by using a correction value Cv calculated based on the unit temperature information th included in the unit temperature signal TH.

The correction request signal output circuit 24 generates a correction value adjustment request signal TRC for defining an adjustment timing of the correction value Cv of the head temperature information tc in the temperature information output circuit 26, and outputs the generated correction value adjustment request signal TRC to the temperature information output circuit 26.

The correction request signal output circuit 24 includes a request signal output circuit 240, a latch counter 242, and a storage circuit 244. The latch counter 242 counts rising edges of the latch signal LAT received by the print heads 22-1 to 22-*n*, and outputs the counted rising edges as a latch count LC. The storage circuit 244 stores a count result of the rising edges of the latch signal LAT in the latch counter 242 as latch count information. The request signal output circuit 240 generates the correction value adjustment request signal TRC indicating the adjustment timing of the correction value Cv of the head temperature information tc in the temperature information output circuit 26 based on the latch count LC output from the latch counter 242 and the latch count information stored in the storage circuit 244. The correction request signal output circuit 24 outputs the correction value adjustment request signal TRC generated by the request signal output circuit 240 to the temperature information output circuit 26.

The temperature information output circuit 26 adjusts the correction value Cv of the head temperature information tc based on the unit temperature information th included in the unit temperature signal TH at a predetermined timing after receiving the correction value adjustment request signal TRC for requesting the adjustment of the correction value Cv of the head temperature information tc from the correction request signal output circuit 24. Thereafter, the temperature information output circuit 26 corrects the head temperature information tc by using the adjusted correction value Cv, and outputs the temperature information signal TI according to the amplified signal to the control circuit 100.

Here, details of a configuration and operation of the temperature information output circuit 26 and details of an operation of the correction request signal output circuit 24 will be described later.

Signal Waveform of Drive Signal COM and Functional Configuration of Drive Signal Selection Circuit Next, a configuration and an operation of the drive signal selection circuit 200 provided in the print head 22 will be described. As described above, the drive signal selection circuit 200 provided in the print head 22 selects or deselects the signal waveform included in the drive signal COM based on the clock signal SCK, the print data signal SI, the latch signal LAT, and the change signal CH to generate the drive signal VOUT and outputs the generated drive signal VOUT to the corresponding piezoelectric element 60. Therefore, in describing the configuration and the operation of the drive signal selection circuit 200, first, an example of a waveform of the drive signal COM received by the drive signal selection circuit 200 will be described.

FIG. 8 is a diagram illustrating an example of the signal waveform of the drive signal COM. As illustrated in FIG. 8, the drive signal COM includes a trapezoidal waveform Adp disposed in a period t1 from when the latch signal LAT rises to when the change signal CH rises, a trapezoidal waveform Bdp disposed in a period t2 from when the change signal CH rises to when the change signal CH rises next, and a trapezoidal waveform Cdp disposed in a period t3 from when the change signal CH rises to when the latch signal LAT rises. The trapezoidal waveform Adp is a signal waveform for driving the piezoelectric element 60 such that a predetermined amount of ink is dispensed, the trapezoidal waveform Bdp is a signal waveform for driving the piezoelectric element 60 such that a smaller amount of ink than the predetermined amount is dispensed, and the trapezoidal waveform Cdp is a signal waveform for driving the piezoelectric element 60 such that ink is not dispensed. Here, when being supplied to the piezoelectric element 60, the trapezoidal waveform Cdp is a signal waveform for reducing a possibility that an increase in ink viscosity in the vicinity of a nozzle opening by vibrating the ink in the vicinity of the corresponding nozzle opening in the piezoelectric element 60.

The trapezoidal waveforms Adp, Bdp, and Cdp have a common signal waveform in which voltage values at respective start timings and end timings are a voltage Vc. That is, each of the trapezoidal waveforms Adp, Bdp, and Cdp starts at the voltage Vc and ends at the voltage Vc.

In the following description, when the trapezoidal waveform Adp is supplied to the piezoelectric element 60, the predetermined amount of ink to be dispensed may be referred to as a medium amount, and when the trapezoidal waveform Bdp is supplied to the piezoelectric element 60, a smaller amount of ink than the predetermined amount to be dispensed may be referred to as a small amount. Further, when the trapezoidal waveform Cdp is supplied to the piezoelectric element 60, an operation for preventing an increase in ink viscosity by vibrating the ink in the vicinity of the nozzle opening corresponding to the piezoelectric element 60 may be referred to as fine vibration. The signal waveform of the drive signal COM illustrated in FIG. 8 is an example and is not limited thereto. As the signal waveform of the drive signal COM, a combination of various waveforms may be used according to a property of the dispensed ink, a material of the medium P on which the ink lands, and the like.

The drive signal selection circuit 200 selects or deselects the trapezoidal waveforms Adp, Bdp, and Cdp included in the drive signal COM in a cycle tp including the periods t1, t2, and t3. Accordingly, the drive signal selection circuit 200 controls the dispensing amount of the ink dispensed from each of the plurality of nozzles 321 in the cycle tp. That is, the drive signal selection circuit 200 controls a dot size formed at the medium P in the cycle tp. In the cycle tp including the periods t1, t2, and t3, dots of a predetermined size are formed at the medium P. The cycle tp in which the dots of the predetermined size are formed corresponds to a dot formation cycle.

Next, the configuration and the operation of the drive signal selection circuit 200 that generates the drive signal VOUT by selecting or deselecting the signal waveform included in the drive signal COM will be described. FIG. 9 is a diagram illustrating the configuration of the drive signal selection circuit 200. As illustrated in FIG. 9, the drive signal selection circuit 200 includes a selection control circuit 210 and the same number of selection circuits 230 as the plurality of piezoelectric elements 60. In the following description, a case will be described in which the print head 22 includes the p piezoelectric elements 60. That is, the drive signal selection circuit 200 includes the p selection circuits 230.

The selection control circuit 210 receives the clock signal SCK, the print data signal SI, the latch signal LAT, and the change signal CH. In the selection control circuit 210, a set including a shift register (S/R) 212, a latch circuit 214, and decoder 216 is provided corresponding to each of the p piezoelectric elements 60. That is, the drive signal selection circuit 200 includes the p shift registers 212, the p latch circuits 214, and the p decoders 216.

The print data signal SI is input to the selection control circuit 210 in synchronization with the clock signal SCK. The print data signal SI serially includes 2-bit print data [SIH, SIL] for selecting any one of a “large dot LD”, a “medium dot MD”, a “small dot SD”, and “non-recording ND” for each of the p piezoelectric elements 60. The print data [SIH, SIL] included in the print data signal SI is held in the p shift registers 212 corresponding to the p piezoelectric elements 60.

Specifically, the p shift registers 212 corresponding to the piezoelectric elements 60 are cascade-coupled to one another, and the serially input print data signal SI is sequentially transferred to the subsequent shift register 212 according to the clock signal SCK. When the print data [SIH, SIL] is held in the corresponding shift register 212, the clock signal SCK is stopped. Accordingly, the print data [SIH, SIL] included in the print data signal SI is held in the corresponding shift register 212. In FIG. 9, to distinguish the p shift registers 212 from one another, the p shift registers 212 are denoted by a first-stage, a second-stage, . . . , and a p-stage in order from an upstream side to which the print data signal SI is received.

Each of the p latch circuits 214 latches the print data [SIH, SIL] held in the corresponding shift register 212 at the same time at the rising of the latch signal LAT. Then, the print data [SIH, SIL] latched by the latch circuit 214 is input to the corresponding decoder 216. FIG. 10 is a diagram illustrating an example of decoding contents in the decoder 216. The decoder 216 outputs a selection signal S of a logic level defined by received print data [SIH, SIL] in each of the periods t1, t2, and t3. For example, when the print data [SIH, SIL]=[1, 0] is input to the decoder 216, the decoder 216 outputs the logic level of the selection signal S as H, L, and L levels in the periods t1, t2, and t3.

Figure 11:
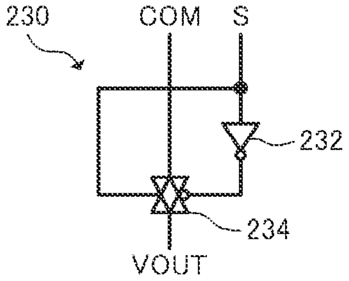
FIG. 11 is a diagram illustrating a configuration of a selection circuit.

The selection signal S output from the decoder 216 is received by the selection circuit 230. The selection circuit 230 is provided corresponding to each of the p piezoelectric elements 60. That is, the drive signal selection circuit 200 includes the same number of p selection circuits 230 as the p piezoelectric elements 60. FIG. 11 is a diagram illustrating a configuration of the selection circuit 230. As illustrated in FIG. 11, the selection circuit 230 includes an inverter 232 that is a NOT circuit and a transfer gate 234.

The selection signal S is input to a positive control terminal of the transfer gate 234 that is not marked with a circle, and is also input to a negative control terminal of the transfer gate 234 that is marked with a circle after the logic level is inverted by the inverter 232. The drive signal COM is supplied to an input terminal of the transfer gate 234. Then, the transfer gate 234 makes the input terminal and an output terminal conductive when receiving the selection signal S of a high level, and makes the input terminal and the output terminal non-conductive when receiving the selection signal S of a low level. That is, the transfer gate 234 outputs the signal waveform included in the drive signal COM when the logic level of the selection signal S is high from the output terminal, and does not output the signal waveform included in the drive signal COM when the logic level of the selection signal S is low from the output terminal. Then, the drive signal selection circuit 200 outputs a signal output to the output terminal of the transfer gate 234 provided in the selection circuit 230 as the drive signal VOUT.

Figure 12:
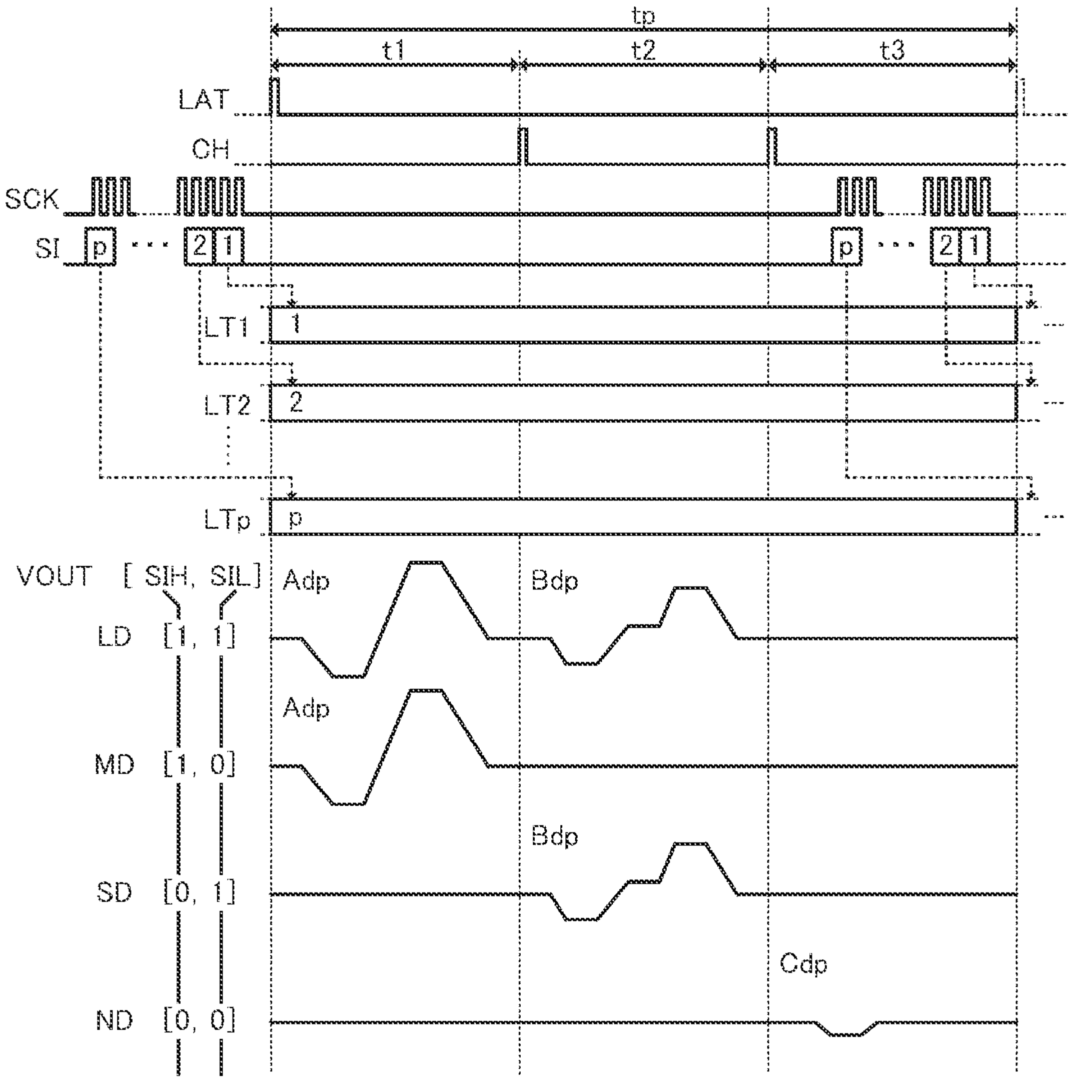
FIG. 12 is a diagram illustrating an operation of the drive signal selection circuit.

Here, an operation of the drive signal selection circuit 200 will be described with reference to FIG. 12. FIG. 12 is a diagram illustrating the operation of the drive signal selection circuit 200. The print data signal SI is input to the selection control circuit 210 as a serial signal synchronized with the clock signal SCK. The print data signal SI is sequentially transferred to the p shift registers 212 corresponding to the p piezoelectric elements 60 in synchronization with the clock signal SCK. Thereafter, when an input of the clock signal SCK is stopped, the print data [SIH, SIL] corresponding to each of the p piezoelectric elements 60 is held in the shift register 212. The print data signal SI is input in an order corresponding to the piezoelectric elements 60 of the p-stage, . . . , second-stage, and first-stage shift registers 212.

When the latch signal LAT rises, each of the latch circuits 214 latches the print data [SIH, SIL] held in the shift register 212 at the same time. LT1, LT2, . . . , and LTp illustrated in FIG. 12 indicate the print data [SIH, SIL] latched by the latch circuits 214 corresponding to the first-stage, second-stage, . . . , and p-stage shift registers 212.

The decoder 216 outputs the logic level of the selection signal S with contents illustrated in FIG. 12 in each of the periods t1, t2, and t3 according to a dot size defined by the latched print data [SIH, SIL]. Then, the selection circuit 230 selects or deselects the signal waveform included in the drive signal COM according to the logic level of the selection signal S output from the decoder 216 to generate the drive signal VOUT.

Specifically, when the print data [SIH, SIL]=[1,1] is input to the decoder 216, the decoder 216 sets the logic level of the selection signal S to H, H, and L levels in the periods t1, t2, and t3. Accordingly, the selection circuit 230 selects the trapezoidal waveform Adp in the period t1, selects the trapezoidal waveform Bdp in the period t2, and does not select the trapezoidal waveform Cdp in the period t3. As a result, the drive signal selection circuit 200 outputs the drive signal VOUT corresponding to the “large dot LD”.

When the drive signal VOUT corresponding to the “large dot LD” is supplied to the piezoelectric element 60, the medium amount of ink is dispensed in the period t1, the small amount of ink is dispensed in the period t2, and no ink is dispensed in the period t3. Then, the medium amount of the dispensed ink and the small amount of the dispensed ink land on and combine with the medium P, and the “large dot LD” is formed at the medium P.

When the print data [SIH, SIL]=[1, 0] is input to the decoder 216, the decoder 216 sets the logic level of the selection signal S to H, L, and L levels in the periods t1, t2, and t3. Accordingly, the selection circuit 230 selects the trapezoidal waveform Adp in the period t1, does not select the trapezoidal waveform Bdp in the period t2, and does not select the trapezoidal waveform Cdp in the period t3. As a result, the drive signal selection circuit 200 outputs the drive signal VOUT corresponding to the “medium dot MD”.

When the drive signal VOUT corresponding to the “medium dot MD” is supplied to the piezoelectric element 60, the medium amount of ink is dispensed in the period t1, the ink is not dispensed in the period t2, and the ink is not dispensed in the period t3. Then, the medium amount of dispensed ink lands on the medium P, and the “medium dot MD” is formed at the medium P.

When the print data [SIH, SIL]=[0, 1] is input to the decoder 216, the decoder 216 sets the logic level of the selection signal S to L, H, and L levels in the periods t1, t2, and t3. Accordingly, the selection circuit 230 does not select the trapezoidal waveform Adp in the period t1, selects the trapezoidal waveform Bdp in the period t2, and does not select the trapezoidal waveform Cdp in the period t3. As a result, the drive signal selection circuit 200 outputs the drive signal VOUT corresponding to the “small dot SD”.

When the drive signal VOUT corresponding to the “small dot SD” is supplied to the piezoelectric element 60, the ink is not dispensed in the period t1, the small amount of ink is dispensed in the period t2, and the ink is not dispensed in the period t3. Then, the small amount of dispensed ink lands on the medium P, and the “small dot SD” is formed at the medium P.

When the print data [SIH, SIL]=[0, 0] is input to the decoder 216, the decoder 216 sets the logic level of the selection signal S to L, L, and H levels in the periods t1, t2, and t3. Accordingly, the selection circuit 230 does not select the trapezoidal waveform Adp in the period t1, does not select the trapezoidal waveform Bdp in the period t2, and selects the trapezoidal waveform Cdp in the period t3. As a result, the drive signal selection circuit 200 outputs the drive signal VOUT corresponding to the “non-recording ND”.

When the drive signal VOUT corresponding to the “non-recording ND” is supplied to the piezoelectric element 60, the ink is not dispensed in the period t1, the ink is not dispensed in the period t2, and the ink is not dispensed in the period t3. Accordingly, the “non-recording ND” in which no dot is formed at the medium P is obtained. At this time, the drive signal VOUT including the trapezoidal waveform Cdp is input to the corresponding piezoelectric element 60. Therefore, the fine vibration is performed. As a result, a possibility that an increase in ink viscosity in the vicinity of an opening of the corresponding nozzle 321 is reduced.

In this way, the drive signal selection circuit 200 selects or deselects the signal waveform of the drive signal COM output from the drive circuit 50 to generate the drive signal VOUT and output the generated drive signal VOUT to the corresponding piezoelectric element 60. Therefore, the drive signal VOUT includes any one of the trapezoidal waveforms Adp, Bdp, and Cdp included in the drive signal COM output from the drive circuit 50. In this case, the print head 22 that dispenses the ink based on the drive signal VOUT can be regarded as dispensing the ink based on the drive signal COM. At this time, the latch signal LAT defines a dispensing timing of the ink from the print head 22, that is, a timing of dot formation for forming dots at the medium P. That is, the latch counter 242 that counts the rising of the latch signal LAT counts the dispensing timing of the ink from the print head 22.

Configuration of Temperature Information Output Circuit

Figure 13:
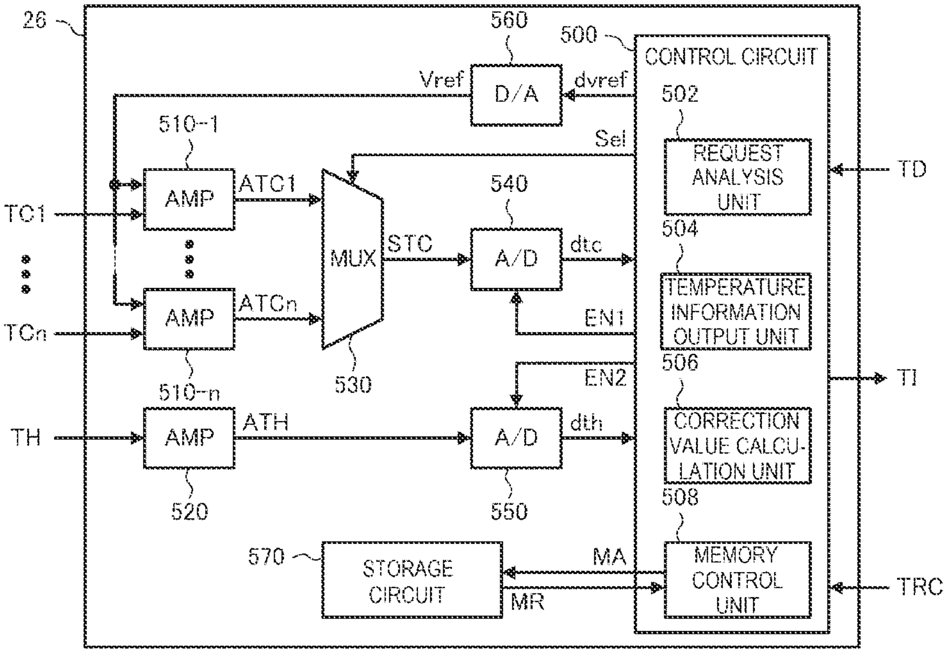
FIG. 13 is a diagram illustrating an example of a configuration of a temperature information output circuit.

Next, the configuration and the operation of the temperature information output circuit 26 will be described. FIG. 13 is a diagram illustrating an example of the configuration of the temperature information output circuit 26. The temperature information output circuit 26 acquires the head temperature signals TC1 to TCn including the head temperature information tc1 to tcn received from the print heads 22-1 to **22-*n*, respectively, and the unit temperature signal TH including the unit temperature information th received from the temperature detection circuit 28, and generates the temperature information signal TI indicating the temperature of the print head 22 according to the temperature acquisition request signal TD received from the control circuit 100. Then, the temperature information output circuit 26 outputs the generated temperature information signal TI to the control circuit 100**.

As illustrated in FIG. 13, the temperature information output circuit 26 includes a control circuit 500, amplification circuits 510-1 to **510-*n* and 520, a multiplexer 530, AD conversion circuits 540 and 550, a DA conversion circuit 560, and a storage circuit 570**.

The amplification circuits 510-1 to **510-*n* are provided corresponding to the print heads 22-1 to 22-*n*. The amplification circuits 510-1 to 510-*n* receive the head temperature signals TC1 to TCn output from the corresponding print heads 22-1 to 22-*n* and a reference potential signal Vref. The amplification circuits 510-1 to 510-*n* amplify the corresponding head temperature signals TC1 to TCn by using a voltage value of the reference potential signal Vref as a reference potential to generate and output head temperature amplification signals ATC1** to ATCn.

Specifically, the amplification circuit 510-1 receives the head temperature signal TC1 output from the print head 22-1 and the reference potential signal Vref. The amplification circuit 510-1 outputs the head temperature amplification signal ATC1 obtained by amplifying a difference between a voltage value of the received head temperature signal TC1 and the voltage value of the received reference potential signal Vref. The amplification circuit **510-*j* (j is any one of 1 to n) receives the head temperature signal TCj output from the print head 22-*j* and the reference potential signal Vref. The amplification circuit 510-*j* outputs the head temperature amplification signal ATCj obtained by amplifying a difference between a voltage value of the received head temperature signal TCj and the voltage value of the received reference potential signal Vref. Here, the amplification circuits 510-1 to 510-*n* have the same configuration, and may be referred to as an amplification circuit 510 when there is no need to distinguish the amplification circuits 510-1 to 510-*n* in the following description. In this case, a case will be described in which the amplification circuit 510 receives the head temperature signal TC as the head temperature signals TC1 to TCn and the reference potential signal Vref, and a head temperature amplification signal ATC as the head temperature amplification signals ATC1** to ATCn is output.

The multiplexer 530 receives the head temperature amplification signals ATC1 to ATCn output from the amplification circuits 510-1 to **510-*n*. The multiplexer 530 further receives a select signal Sel output from the control circuit 500. The multiplexer 530 selects one of the head temperature amplification signals ATC1 to ATCn received from the amplification circuits 510-1 to 510-*n*** according to the received select signal Sel, and outputs the selected head temperature amplification signal as a selection temperature signal STC.

The AD conversion circuit 540 receives the selection temperature signal STC output from the multiplexer 530 and an enable signal EN1 output from the control circuit 500. The AD conversion circuit 540 converts the selection temperature signal STC received during a period in which the received enable signal EN1 is enabled into a digital signal and outputs the digital signal to the control circuit 500. That is, the AD conversion circuit 540 generates a digital signal according to a voltage value obtained by amplifying, by the amplification circuit 510, a voltage value of the head temperature information tc included in the head temperature signal TC selected by the multiplexer 530 during the period in which the enable signal EN1 is enabled, which is a digital signal having a voltage value according to the temperature of the print head 22 according to the head temperature signal TC selected by the multiplexer 530 during the period in which the enable signal EN1 is enabled, and outputs the generated digital signal to the control circuit 500. In the following description, the digital signal output from the AD conversion circuit 540 is referred to as digital temperature information dtc.

The amplification circuit 520 receives the unit temperature signal TH. The amplification circuit 520 amplifies the received unit temperature signal TH to output a unit amplification temperature signal ATH.

The AD conversion circuit 550 receives the unit amplification temperature signal ATH output from the amplification circuit 520 and an enable signal EN2 output from the control circuit 500. The AD conversion circuit 550 converts the unit amplification temperature signal ATH received during a period in which the received enable signal EN2 is enabled into a digital signal and outputs the digital signal to the control circuit 500. That is, the AD conversion circuit 540 generates a digital signal according to a voltage value obtained by amplifying, by the amplification circuit 520, a voltage value of the unit temperature information th included in the unit temperature signal TH received during the period in which the enable signal EN2 is enabled, which is a digital signal having a voltage value according to the temperature of the head unit 20 during the period in which the enable signal EN2 is enabled, and outputs the generated digital signal to the control circuit 500. In the following description, the digital signal output from the AD conversion circuit 550 may be referred to as digital temperature information dth.

The DA conversion circuit 560 receives a digital reference potential signal dvref output from the control circuit 500. The DA conversion circuit 560 generates the reference potential signal Vref by converting the digital reference potential signal dvref into an analog signal. Then, the DA conversion circuit 560 outputs the generated reference potential signal Vref to the amplification circuits 510-1 to **510-*n*. That is, a voltage value of the reference potential signal Vref received by the amplification circuits 510-1 to 510-*n* is controlled by the control circuit 500 and the DA conversion circuit 560**.

The control circuit 500 includes a request analysis unit 502, a temperature information output unit 504, a correction value calculation unit 506, and a memory control unit 508. The control circuit 500 receives the temperature acquisition request signal TD. Then, the control circuit 500 outputs the select signal Sel, the enable signals EN1 and EN2, and the digital reference potential signal dvref according to the received temperature acquisition request signal TD. Accordingly, the control circuit 500 controls various components provided in the temperature information output circuit 26. Further, the control circuit 500 receives the digital temperature information dtc. The control circuit 500 generates the temperature information signal TI based on the received digital temperature information dtc, and outputs the generated temperature information signal TI from the temperature information output circuit 26.

Specifically, the request analysis unit 502 acquires the temperature acquisition request signal TD received by the control circuit 500. The request analysis unit 502 analyzes the acquired temperature acquisition request signal TD and generates the digital reference potential signal dvref, the select signal Sel, and the enable signals EN1 and EN2 according to an analysis result. The control circuit 500 outputs the digital reference potential signal dvref, the select signal Sel, and the enable signals EN1 and EN2 generated by the request analysis unit 502 to corresponding components of the temperature information output circuit 26.

The temperature information output unit 504 acquires the digital temperature information dtc received by the control circuit 500. The temperature information output unit 504 converts the acquired digital temperature information dtc into the temperature information signal TI according to temperatures of the print heads 22-1 to **22-*n* by using a predetermined conversion function. The control circuit 500 outputs the temperature information signal TI corresponding to the digital temperature information dtc converted by the temperature information output unit 504 to the control circuit 100**.

The correction value calculation unit 506 calculates the correction value Cv for correcting the temperature information signal TI output from the control circuit 500, for example, the correction value Cv used for correcting a variation of the resistance wiring 401 provided in the temperature detection circuit 250 indicating the temperature of the print head 22. The correction value calculation unit 506 calculates the correction value Cv for correcting the temperature information signal TI based on the digital temperature information dtc according to the temperature of the print head 22 and the digital temperature information dth according to the temperature of the head unit 20 at a predetermined timing after the temperature acquisition request signal including a calculation request of the correction value Cv is received from the control circuit 100 or at a predetermined timing based on the correction value adjustment request signal TRC. That is, the control circuit 500 outputs the temperature information signal TI corrected based on the correction value Cv calculated by the correction value calculation unit 506. Here, the correction value Cv calculated by the correction value calculation unit 506 may be, for example, a value for correcting a voltage value defined by the digital reference potential signal dvref generated by the request analysis unit 502 or a value for correcting the predetermined conversion function used when the temperature information output unit 504 converts the digital temperature information dtc into the temperature information signal TI.

The memory control unit 508 generates a memory control signal MA for accessing the storage circuit 570, outputs the generated memory control signal MA to the storage circuit 570, and acquires a memory read signal MR output from the storage circuit 570 according to the memory control signal MA.

Specifically, the storage circuit 570 stores an initial setting value Ivref of the above-described voltage value of the reference potential signal Vref, the predetermined conversion function used when converting the digital temperature information dtc into the temperature information signal TI, and the correction value Cv calculated by the correction value calculation unit 506 for correcting the temperature information signal TI. The memory control unit 508 generates the memory control signal MA for reading the initial setting value Ivref, the conversion function, or the correction value Cv stored in the storage circuit 570, and outputs the generated memory control signal MA to the storage circuit 570. The storage circuit 570 reads the initial setting value Ivref, the conversion function, or the correction value Cv according to the received memory control signal MA, and outputs the memory read signal MR including read information. Accordingly, information stored in the storage circuit 570 is read by the control circuit 500.

Here, for example, the temperature information output circuit 26 may be implemented as an integrated circuit. Accordingly, a mounting area of the temperature information output circuit 26 in the head unit 20 can be reduced, and as a result, the head unit 20 can be downsized. In this case, the number of integrated circuits implementing the temperature information output circuit 26 is not limited to one and may be plural.

Operation of Temperature Information Output Circuit

An outline of the operation of the temperature information output circuit 26 implemented in this way will be described. When the temperature information output circuit 26 receives the temperature acquisition request signal TD requesting the acquisition of the temperature of the print head 22 which is any one of the print heads 22-1 to **22-*n* from the control circuit 100, the request analysis unit 502 provided in the control circuit 500 acquires and analyzes the received temperature acquisition request signal TD. Then, the memory control unit 508 reads the initial setting value Ivref, the conversion function, and the correction value Cv corresponding to the print head 22 from the storage circuit 570 according to the analysis result of the request analysis unit 502**.

The control circuit 500 generates the digital reference potential signal dvref by adding or subtracting the correction value Cv to or from the initial setting value Ivref read from the storage circuit 570, and outputs the generated digital reference potential signal dvref to the DA conversion circuit 560. The DA conversion circuit 560 generates and outputs the reference potential signal Vref having a voltage value according to the digital reference potential signal dvref. The reference potential signal Vref output from the DA conversion circuit 560 is received by each of the amplification circuits 510-1 to **510-*n***.

Figure 14:
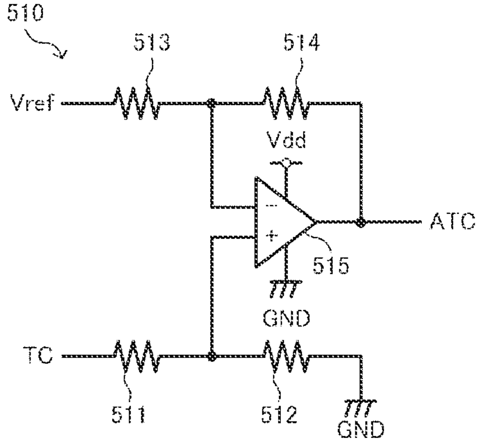
FIG. 14 is a diagram illustrating a specific example of a configuration of an amplification circuit.

Here, a specific example of a configuration of the amplification circuit 510 will be described. FIG. 14 is a diagram illustrating the specific example of the configuration of the amplification circuit 510. As illustrated in FIG. 14, the amplification circuit 510 includes resistors 511 to 514 and an operational amplifier 515.

A voltage Vdd of any voltage value is input to a high voltage side input terminal and a ground potential GND is supplied to a low voltage side input terminal of the operational amplifier 515. That is, the operational amplifier 515 operates based on a potential difference between the voltage Vdd and the ground potential GND. A + side input terminal of the operational amplifier 515 is electrically coupled to one end of the resistor 511 and one end of the resistor 512, and a − side input terminal of the operational amplifier 515 is electrically coupled to one end of the resistor 513 and one end of the resistor 514. The head temperature signal TC is input to the other end of the resistor 511, the ground potential GND is supplied to the other end of the resistor 512, the reference potential signal Vref is supplied to the other end of the resistor 513, and the other end of the resistor 514 is electrically coupled to an output terminal of the operational amplifier 515.

The amplification circuit 510 implemented in this way implements a so-called differential amplification circuit that generates and outputs the head temperature amplification signal ATC by amplifying a signal according to a difference between the voltage value of the head temperature signal TC output from the print head 22 and the voltage value of the reference potential signal Vref at an amplification factor defined by the resistors 511 to 514. In other words, the temperature information output circuit 26 includes the amplification circuit 510 that amplifies the difference between the reference potential signal Vref and the head temperature signal TC.

Figure 15:
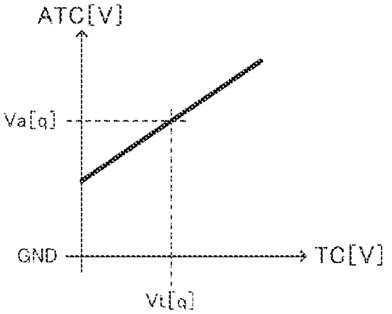
FIG. 15 is a diagram illustrating an example of a correlation between a voltage value of a head temperature signal TC received by the amplification circuit and a voltage value of a head temperature amplification signal ATC output from the amplification circuit.

FIG. 15 is a diagram illustrating an example of a correlation between the voltage value of the head temperature signal TC received by the amplification circuit 510 and a voltage value of the head temperature amplification signal ATC output the amplification circuit 510. Here, FIG. 15 illustrates any voltage value of the head temperature signal TC as a voltage Vt[q], and illustrates a voltage value of the head temperature amplification signal ATC output from the amplification circuit 510 as a voltage Va[q] when the amplification circuits 510 receives the voltage Vt[q] as the head temperature signal TC. That is, the voltage Vt[q] illustrated in FIG. 15 corresponds to a voltage value of the head temperature information tc acquired by the temperature detection circuit 250 of the print head 22 at any timing, and the voltage Va[q] corresponds to a voltage value obtained by amplifying the head temperature information tc acquired by the temperature detection circuit 250 at any timing. In the following description, when the description is made without defining an acquisition timing of the head temperature information tc in the temperature detection circuit 250, the voltage value of the head temperature signal TC may be referred to as a voltage Vt, and the voltage value of the head temperature amplification signal ATC output from the amplification circuit 510 may be referred to as a voltage Va when the voltage Vt is input to the amplification circuit 510.

As illustrated in FIG. 15, the amplification circuit 510 outputs the head temperature amplification signal ATC whose voltage value has linearity with respect to the voltage value of the head temperature signal TC received from the print head 22. When the voltage value of the reference potential signal Vref received by the amplification circuit 510 is a voltage vref and resistance values of the resistors 511 to 514 are resistance values r511 to r514, respectively, the voltage Vt[q] received by the amplification circuit 510 and the voltage Va[q] output from the amplification circuit 510 have a correlation represented by the following equation (1).

$$Va[q] = \left(\frac{r513 + r514}{r513}\right)\left(\frac{r512}{r511 + r512}\right)Vt[q] - \frac{r514}{r513}vref \tag{1}$$

In Equation (1), the resistance values of the resistors 511 to 514 are set such that a ratio of the resistance value of the resistor 511 to the resistance value of the resistor 512 is equal to a ratio of the resistance value of the resistor 513 to the resistance value of the resistor 514, the resistance value of the resistor 511 may be equal to the resistance value of the resistor 513, and the resistance value of the resistor 512 may be equal to the resistance value of the resistor 514. Accordingly, Equation (1) described above can be expressed as the following Equation (2).

$$Va[q] = \left(\frac{r514}{r513}\right)(Vt[q] - vref) \tag{2}$$

Here, the resistance values being equal to each other is not limited to a case where the measured resistance values are equal to each other, and includes a range in which the resistance values are considered to be equivalent when taking into account a variation in the resistance values. That is, the resistance value of the resistor 511 being equal to the resistance value of the resistor 513 includes a case where a rating resistance value of the resistor 511 is equal to a rating resistance value of the resistor 513. The resistance value of the resistor 512 being equal to the resistance value of the resistor 514 includes a case where a rating resistance value of the resistor 512 is equal to a rating resistance value of the resistor 514.

In this way, the amplification circuit 510 according to the embodiment outputs the voltage Va[q] obtained by multiplying a voltage difference between the voltage Vt[q] and the voltage vref by the amplification factor defined by the ratio of the resistance values of the resistors 513 and 514. In other words, the amplification circuit 510 implements the differential amplification circuit that amplifies the difference between the reference potential signal Vref and the head temperature signal TC. When receiving the head temperature signal TC whose voltage value is the voltage Vt[q], the amplification circuit 510 outputs the head temperature amplification signal ATC whose voltage value is the voltage Va[q].

Returning to FIG. 13, the control circuit 500 outputs the digital reference potential signal dvref of a value obtained by adding or subtracting the correction value Cv to or from the initial setting value Ivref read from the storage circuit 570, and then outputs the select signal Sel for causing the multiplexer 530 to select the head temperature amplification signal ATC corresponding to the print head 22. Accordingly, the head temperature amplification signal ATC whose voltage value output from the amplification circuit 510 corresponding to the print head 22 is the voltage Va[q] is input to the AD conversion circuit 540 via the multiplexer 530. The AD conversion circuit 540 generates the digital temperature information dtc obtained by converting the voltage Va[q], which is the voltage value of the head temperature amplification signal ATC, into a digital signal, and outputs the generated digital temperature information dtc to the control circuit 500. Here, in the following description, the digital temperature information dtc obtained by converting the voltage Va[q] into a digital signal may be referred to as a digital voltage dVa[q].

The digital voltage dVa[q] input to the control circuit 500 is acquired by the temperature information output unit 504. The temperature information output unit 504 substitutes the acquired digital voltage dVa[q] into the following equation (3) to convert the digital voltage dVa[q] into head temperature information Tph[q] indicating the temperature of the corresponding print head 22, and outputs the temperature information signal TI including the head temperature information Tph[q].

$$Tph[q] = \alpha \times dVa[q] + \beta \tag{3}$$

Here, a coefficient α and a coefficient β in Equation (3) are defined based on a change in resistance value with respect to the temperature of the resistance wiring 401 provided in the print head 22. The coefficient α and the coefficient β can be calculated based on a detection result obtained by detecting the voltage Va[q] when the print head 22 is set to a first predetermined temperature and the voltage Va[q] when the print head 22 is set to a second predetermined temperature in a manufacturing stage of the print head 22. That is, the coefficient α and the coefficient β are calculated based on a temperature characteristic of the resistance value of platinum (Pt) having high linearity of the change in resistance value with respect to the temperature change. The coefficient α and the coefficient β calculated in the manufacturing stage are stored in the storage circuit 570. That is, the coefficient α and the coefficient β corresponding to each of the print heads 22-1 to **22-*n* are stored in the storage circuit 570**.

The temperature information output unit 504 reads the coefficient α and the coefficient β corresponding to the print head 22 specified based on the analysis result of the temperature acquisition request signal TD by the request analysis unit 502 from the storage circuit 570 as at least a part of the predetermined conversion functions used when converting the digital temperature information dtc into the temperature information signal TI. In other words, the storage circuit 570 stores the coefficient α and the coefficient β as conversion functions for converting the head temperature signal TC into the temperature information signal TI. The temperature information output unit 504 substitutes the read coefficient α, the read coefficient β, and the digital voltage dva[q] as the digital temperature information dtc received via the AD conversion circuit 540 in Equation (3) described above to convert into the head temperature information Tph[q] indicating the temperature of the print head 22. Then, the temperature information output unit 504 outputs the temperature information signal TI including the head temperature information Tph[q] obtained by the conversion to the control circuit 100.

Next, a specific example of the calculation of the correction value Cv in the correction value calculation unit 506 will be described. In the liquid dispensing apparatus 1 according to the embodiment, the correction value calculation unit 506 provided in the temperature information output circuit 26 calculates the correction value Cv for correcting the variation of the resistance wiring 401 provided in the temperature detection circuit 250 indicating the temperature of the print head 22, which is the correction value Cv corresponding to each of the print heads 22-1 to **22-*n*, at the predetermined timing after the temperature acquisition request signal TD including the calculation request of the correction value Cv is received from the control circuit 100 or at a predetermined timing after receiving the correction value adjustment request signal TRC including the calculation request of the correction value Cv from the correction request signal output circuit 24, and stores the calculated correction value Cv in the storage circuit 570 based on the memory control unit 508**.

Here, the predetermined timing at which the correction value calculation unit 506 calculates the correction value Cv is a timing at which the ink stored in the pressure chamber 312 of the print head 22 is sufficiently cooled, for example, may be a timing at which the liquid dispensing apparatus 1 is activated by supplying a power supply voltage to the liquid dispensing apparatus 1, a timing after so-called flushing processing of forcibly dispensing the ink stored in the pressure chamber 312 is executed, or a timing based on date and time specified by the user.

As described above, in the liquid dispensing apparatus 1 according to the embodiment, the resistance wiring 401 provided in the temperature detection circuit 250 indicating the temperature of the print head 22 is located in the vicinity of the pressure chamber 312. Therefore, the resistance wiring 401 provided in the temperature detection circuit 250 remarkably detects the temperature of the ink stored in the pressure chamber 312 of the print head 22. When the correction value Cv of the resistance wiring 401 provided in such a temperature detection circuit 250 is calculated in a state where the pressure chamber 312 is not sufficiently cooled, accuracy of a calculation result of the correction value Cv may decrease due to an influence of the temperature of the ink stored in the pressure chamber 312.

In contrast, in the liquid dispensing apparatus 1 according to the embodiment, the correction value calculation unit 506 calculates the correction value Cv at the timing at which the ink stored in the pressure chamber 312 of the print head 22 is sufficiently cooled, and therefore a possibility that the temperature of the ink stored in the pressure chamber 312 affects the calculation of the correction value Cv is reduced. As a result, the calculation accuracy of the correction value Cv is improved.

In the liquid dispensing apparatus 1 according to the embodiment, the correction value calculation unit 506 calculates at least one of (A) a correction value Cvv for correcting the voltage value defined by the digital reference potential signal dvref output from the control circuit 500 and (B) a correction value Cvc for correcting the conversion function used when the temperature information output unit 504 converts the digital temperature information dtc into the temperature information signal TI as the correction value Cv corresponding to each of the print heads 22-1 to **22-*n***. Hereinafter, a specific example of the calculation of the correction value Cvv corresponding to (A) described above and the correction value Cvc corresponding to (B) described above will be described.

First, the specific example of (A) the calculation of the correction value Cvv in the correction value Cv for correcting the voltage value defined by the digital reference potential signal dvref output from the control circuit 500 will be described.

When the control circuit 500 starts calculating the correction value Cvv of the print head 22 at a predetermined timing after the temperature acquisition request signal TD including a calculation request of the correction value Cvv is received from the control circuit 100 or at a predetermined timing after the correction value adjustment request signal TRC including the calculation request of the correction value Cvv is received from the correction request signal output circuit 24, the memory control unit 508 reads the initial setting value Ivref, the coefficients α and β, and the correction value Cvv in the correction value Cv corresponding to the print head 22 for which the correction value Cvv is to be calculated from the storage circuit 570.

The control circuit 500 outputs the digital reference potential signal dvref obtained by adding or subtracting the correction value Cvv in the correction value Cv to or from the initial setting value Ivref read from the storage circuit 570 to the DA conversion circuit 560, and then outputs the select signal Sel for causing the multiplexer 530 to select the head temperature amplification signal ATC corresponding to the print head 22 and the enable signals EN1 and EN2. Accordingly, the control circuit 500 receives the digital temperature information dtc corresponding to the head temperature information tc indicating the temperature of the print head 22 and the digital temperature information dth corresponding to the unit temperature information th indicating the temperature of the head unit 20.

The correction value calculation unit 506 calculates the temperature of the head unit 20 based on the digital temperature information dth corresponding to the unit temperature information th received by the control circuit 500. Then, the correction value calculation unit 506 substitutes the calculated temperature of the head unit 20 as the head temperature information Tph[q] in Equation (3). At this time, the coefficients α and β corresponding to the print head 22 read from the storage circuit 570 are substituted into the coefficients α and β in Equation (3).

Here, in the liquid dispensing apparatus 1 according to the embodiment, the correction value calculation unit 506 calculates the correction value Cvv when the ink stored in the pressure chamber 312 of the print head 22 is sufficiently cooled. Accordingly, the temperature of the head unit 20 and the temperature of the pressure chamber 312 detected by the temperature detection circuit 250 of the print head 22 are substantially equal. Therefore, a value obtained by substituting the temperature of the head unit 20 as the head temperature information Tph[q] in Equation (3) and substituting the coefficients α and β corresponding to the print head 22 read from the storage circuit 570 into the coefficients α and β in Equation (3) corresponds to an expected value of the digital temperature information dtc received by the control circuit 500.

Thereafter, the correction value calculation unit 506 adjusts a value to be added to or subtracted from the initial setting value Ivref output to the DA conversion circuit 560 such that the digital temperature information dtc corresponding to the head temperature information tc received by the control circuit 500 is substantially equal to the calculated expected value of the digital temperature information dtc. Then, when the digital temperature information dtc corresponding to the head temperature information tc received by the control circuit 500 is substantially equal to the calculated expected value of the digital temperature information dtc, the correction value calculation unit 506 acquires a predetermined value to be added or subtracted as a new correction value Cvv and stores the new correction value Cvv in the storage circuit 570.

Next, the specific example of the calculation of (B) the correction value Cvc in the correction value Cv for correcting the conversion function used when the temperature information output unit 504 converts the digital temperature information dtc into the temperature information signal TI will be described.

When the control circuit 500 starts calculating the correction value Cvc of the print head 22 at a predetermined timing after the temperature acquisition request signal TD including a calculation request of the correction value Cvc is received from the control circuit 100 or at a predetermined timing after the correction value adjustment request signal TRC including the calculation request of the correction value Cvc is received from the correction request signal output circuit 24, the memory control unit 508 reads the initial setting value Ivref, the coefficients α and β, and the correction value Cvc in the correction value Cv corresponding to the print head 22 that calculates the correction value Cvc from the storage circuit 570.

The control circuit 500 outputs the digital reference potential signal dvref to the DA conversion circuit 560, and then outputs the select signal Sel for causing the multiplexer 530 to select the head temperature amplification signal ATC corresponding to the print head 22 and the enable signals EN1 and EN2. Accordingly, the control circuit 500 receives the digital temperature information dtc corresponding to the head temperature information tc indicating the temperature of the print head 22 and the digital temperature information dth corresponding to the unit temperature information th indicating the temperature of the head unit 20.

The correction value calculation unit 506 calculates the temperature of the head unit 20 based on the digital temperature information dth corresponding to the unit temperature information th received by the control circuit 500. Then, the correction value calculation unit 506 substitutes the calculated temperature of the head unit 20 as the head temperature information Tph[q] in Equation (3). At this time, the coefficient α corresponding to the print head 22 read from the storage circuit 570 is substituted into the coefficient α in Equation (3), and the digital temperature information dtc corresponding to the acquired head temperature information tc indicating the temperature of the print head 22 is substituted into the digital voltage dVa[q] in Equation (3). In addition, when the calculated temperature of the head unit 20 is substituted into the head temperature information Tph[q] in Equation (3) descried above, the coefficient α corresponding to the print head 22 read from the storage circuit 570 is substituted into the coefficient α, and the digital temperature information dtc corresponding to the acquired head temperature information tc indicating the temperature of the print head 22 is substituted into the digital voltage dVa[q], a value obtained by adding or subtracting a predetermined value to or from the coefficient β corresponding to the print head 22 read from the storage circuit 570 is substituted into the coefficient β in Equation (3) such that an equal sign in Equation (3) is satisfied.

The correction value calculation unit 506 acquires the predetermined value to be added to or subtracted from the coefficient β as a new correction value Cvc and stores the new correction value Cvc in the storage circuit 570.

In this way, the liquid dispensing apparatus 1 and the head unit 20 according to the embodiment include a correction method in which the control circuit 500 corrects the head temperature signal TC by adjusting the voltage value of the reference potential signal Vref supplied to the amplification circuit 510 to calculate the correction value Cv based on the unit temperature information th, and a correction method in which the control circuit 500 corrects the head temperature signal TC by adjusting the coefficient α and the coefficient β as the conversion functions for converting the head temperature signal TC stored in the storage circuit 570 into the temperature information signal TI to calculate the correction value Cv. The liquid dispensing apparatus 1 and the head unit 20 may include both the correction method of correcting the head temperature signal TC by adjusting the voltage value of the reference potential signal Vref supplied to the amplification circuit 510 to calculate the correction value Cv based on the unit temperature information th and the correction method of correcting the head temperature signal TC by adjusting the coefficient α and the coefficient β as the conversion functions for converting the head temperature signal TC stored in the storage circuit 570 into the temperature information signal TI to calculate the correction value Cv, or may include only one of the correction methods.

Update of Correction Value in Correction Value Calculation Unit

In the liquid dispensing apparatus 1 according to the embodiment implemented in this way, since the resistance wiring 401 provided in the temperature detection circuit 250 that detects the temperature of the print head 22 is formed at one surface of the vibration plate 350, the resistance wiring 401 can be disposed in the vicinity of the pressure chamber 312 located at the other surface side of the vibration plate 350. Accordingly, the temperature detection circuit 250 including the resistance wiring 401 can accurately detect the temperature of the ink stored in the pressure chamber 312.

In contrast, as the piezoelectric element 60 is deformed as the ink is dispensed from the print head 22, the vibration plate 350 is also deformed. A stress caused by the deformation of the vibration plate 350 is also applied to the resistance wiring 401 formed at the one surface of the vibration plate 350. As a result, the wiring length of the resistance wiring 401 may change, and the resistance value of the resistance wiring 401 may change. As a result, accuracy of detecting the temperature of the pressure chamber 312 by the temperature detection circuit 250 may decrease.

Particularly, as illustrated in the embodiment, when platinum (Pt) is used as the resistance wiring 401, since platinum (Pt) is softer than iron or copper, a change in wiring length accompanying the displacement of the vibration plate 350 is more remarkable, and as a result, a possibility of the decrease in accuracy of detecting of the temperature of the pressure chamber 312 in the temperature detection circuit 250 increases.

In response to such a problem, the head unit 20 provided in the liquid dispensing apparatus 1 according to the embodiment is the head unit 20 that dispenses the ink when receiving the drive signal VOUT based on the drive signal COM corrected based on the temperature information signal TI, and as described above, includes the temperature detection circuit 28 that outputs the unit temperature signal TH including unit temperature information th indicating the temperature of the head unit 20, the print head 22 that dispenses liquid when receiving the drive signal VOUT based on the drive signal COM, the latch counter 242 that counts the number of rising edges of the latch signal LAT for defining the dispensing timing of the ink from the print head 22, and the temperature information output circuit 26 that acquires the head temperature signal TC indicating the temperature of the print head 22 and outputs the temperature information signal TI based on the head temperature signal TC. The print head 22 includes the resistance wiring 401 and the temperature detection circuit 250 that is located at the other side surface in a stacking direction with respect to the vibration plate 350, acquires the head temperature information tc corresponding to the temperature of the pressure chamber 312, and outputs the acquired head temperature information tc as the head temperature signal TC. The temperature information output circuit 26 includes the control circuit 500 that corrects the head temperature signal TC. The control circuit 500 corrects the head temperature signal TC based on the unit temperature signal TH at a predetermined timing after a count number of the rising edges of the latch signal LAT for defining the dispensing timing of the ink that is counted by the latch counter 242 reaches a predetermined value.

In the head unit 20 and the liquid dispensing apparatus 1 implemented in this way, by counting the number of rising edges of the latch signal LAT for defining the dispensing timing of the ink from the print head 22, it is possible to estimate the number of times that the vibration plate 350 is displaced, and it is also possible to estimate a degree of deterioration of the resistance wiring 401 that may occur due to displacement of the vibration plate 350 based on the estimated number of times that the vibration plate 350 is displaced. Then, the control circuit 500 corrects the head temperature signal TC based on the unit temperature signal TH at the predetermined timing after the count number of the rising edges of the latch signal LAT for defining the dispensing timing of the ink that is counted by the latch counter 242 reaches the predetermined value. That is, the control circuit 500 corrects a change in resistance value that may occur due to the deterioration of the resistance wiring 401 at a timing in consideration of the estimated degree of deterioration of the resistance wiring 401. Accordingly, a possibility that accuracy of acquiring the temperature of the print head 22 decreases due to the deterioration of the resistance wiring 401 is reduced. As a result, correction accuracy of the control signals Ctrl-H, Ctrl-C, and Ctrl-T corrected based on the temperature of the print head 22 is improved, and the dispensing accuracy of the ink dispensed from the print head 22 is improved.

Figure 16:
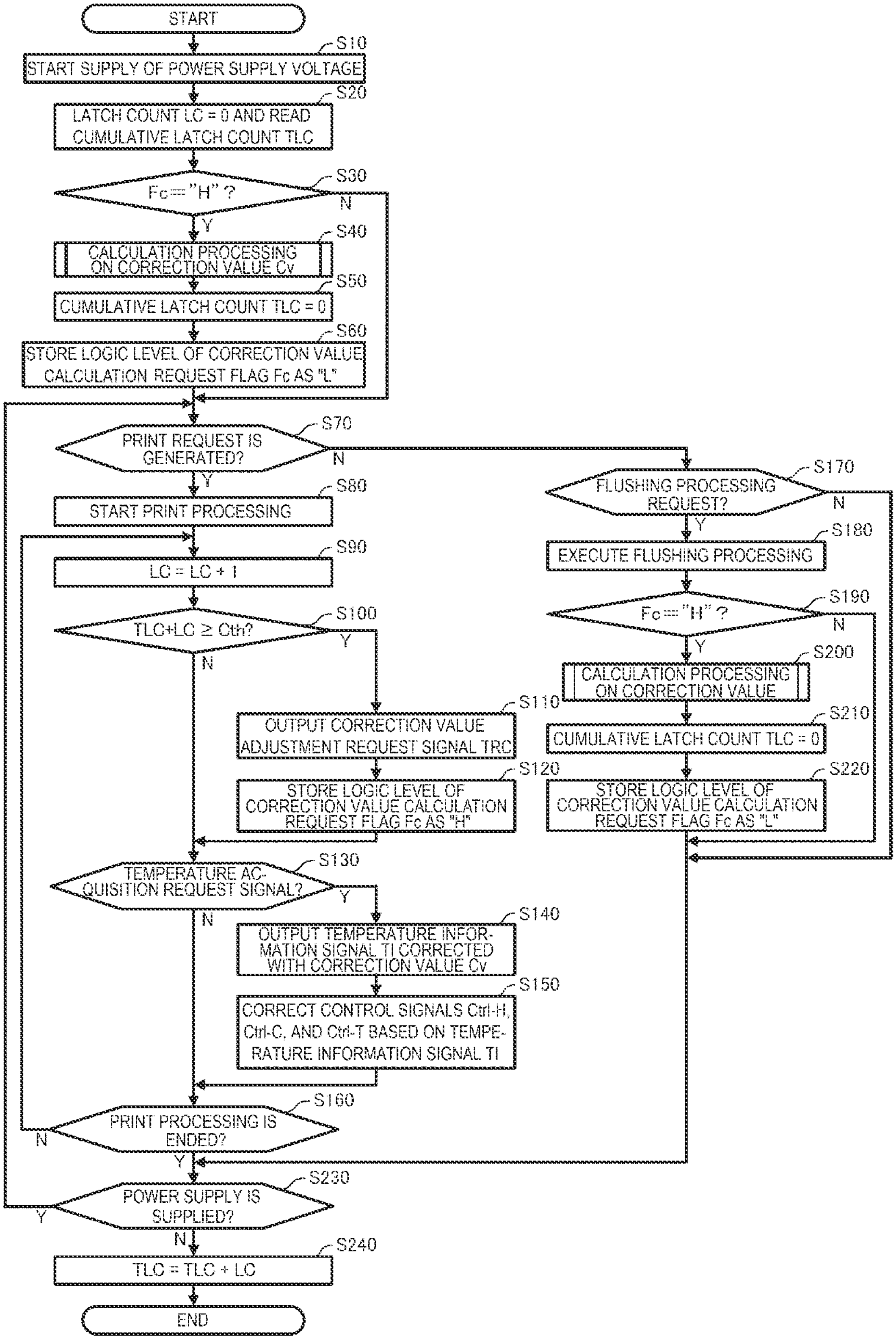
FIG. 16 is a diagram illustrating an example of operations of the liquid dispensing apparatus.

A specific example of the operations of the liquid dispensing apparatus 1 and the head unit 20 implemented in this way will be described. FIG. 16 is a diagram illustrating an example of the operations of the liquid dispensing apparatus 1. As illustrated in FIG. 16, the liquid dispensing apparatus 1 is activated and starts the operations when the supply of the power supply voltage is started (step S10). Then, when the supply of the power supply voltage to the liquid dispensing apparatus 1 is started, the control circuit 100 initializes the latch count LC to "0" as initialization processing of the liquid dispensing apparatus 1, and the request signal output circuit 240 reads a cumulative latch count TLC from the storage circuit 244 (step S20).

Here, the latch counter 242 according to the embodiment counts the rising edges of the latch signal LAT generated after the power supply voltage is applied to the liquid dispensing apparatus 1. That is, the latch count LC output from the latch counter 242 corresponds to the count number of the rising edges of the latch signal LAT generated after the power supply voltage is applied to the liquid dispensing apparatus 1. In contrast, the cumulative latch count TLC stored in the storage circuit 244 corresponds to the count number of the rising edges of the latch signal LAT counted by the latch counter 242 from when calculation processing on the correction value Cv is executed last time to when the power supply is cut off last time. That is, the count number of the rising edges of the latch signal LAT counted by the latch counter 242 from when the calculation processing on the correction value Cv is executed last time to a current time point is a value obtained by adding the latch count LC to the cumulative latch count TLC. The initialization processing of the liquid dispensing apparatus 1 is not limited to the initialization of the latch count LC and the reading of the cumulative latch count TLC described above.

After the supply of the power supply voltage to the liquid dispensing apparatus 1 is started and the initialization processing of the liquid dispensing apparatus 1 is completed, the control circuit 500 of the temperature information output circuit 26 acquires a logic level of a correction value calculation request flag Fc stored in the storage circuit 570. Then, the control circuit 500 determines whether the acquired correction value calculation request flag Fc is at an H level (step S30).

Here, the correction value calculation request flag Fc stored in the storage circuit 570 is a flag for determining whether the correction value adjustment request signal TRC for requesting the adjustment of the correction value Cv is received from the correction request signal output circuit 24. In the embodiment, a case will be described in which the logic level of the correction value calculation request flag Fc is an L level before the correction value adjustment request signal TRC for requesting the adjustment of the correction value Cv is received from the temperature information output circuit 26, and the logic level of the correction value calculation request flag Fc is the H level when the correction value adjustment request signal TRC for requesting the adjustment of the correction value Cv is received from the temperature information output circuit 26.

When the logic level of the correction value calculation request flag Fc acquired by the control circuit 500 is the H level (Y in step S30), the temperature information output circuit 26 executes the calculation processing on the correction value Cv (step S40). In the calculation processing on the correction value Cv, the temperature information output circuit 26 and the correction value calculation unit 506 execute the calculation processing on the correction value Cv according to at least one of (A) the calculation of the correction value Cvv for correcting the voltage value defined by the digital reference potential signal dvref output from the control circuit 500 described above and (B) the calculation of the correction value Cvc for correcting the conversion function used when the temperature information output unit 504 converts the digital temperature information dtc into the temperature information signal TI.

Then, after the calculation processing on the correction value Cv in the temperature information output circuit 26 is completed, the request signal output circuit 240 sets the cumulative latch count TLC stored in the storage circuit 244 to "0" and sets the cumulative latch count TLC read from the storage circuit 244 to "0" (step S50), and the temperature information output circuit 26 sets the logic level of the correction value calculation request flag Fc to the L level and stores the logic level of the correction value calculation request flag Fc in the storage circuit 570 (step S60).

Then, after the temperature information output circuit 26 sets the logic level of the correction value calculation request flag Fc to the L level and stores logic level of the correction value calculation request flag Fc in the storage circuit 570, or when the correction value calculation request flag Fc acquired by the control circuit 500 is at the L level (N in step S30), the control circuit 100 determines whether a print request is generated in the liquid dispensing apparatus 1 (step S70).

When the control circuit 100 determines that the print request is generated (Y in step S70), the control circuit 100 starts print processing (step S80). Specifically, when the print processing is started, the control circuit 100 generates the control signal Ctrl-H including the clock signal SCK, the latch signal LAT, the change signal CH, and the print data signals SI1 to SIn according to the image to be formed at the medium P, and outputs the generated control signal Ctrl-H to the head unit 20. At this time, the latch counter 242 counts the rising edges of the latch signal LAT output from the control circuit 100. Specifically, the latch counter 242 adds "1" to the latch count LC every time the rising of the latch signal LAT is detected (step S90). Then, the latch counter 242 outputs the latch count LC obtained by the addition to the request signal output circuit 240.

The request signal output circuit 240 adds the latch count LC received from the latch counter 242 to the cumulative latch count TLC read from the storage circuit 244. Accordingly, the request signal output circuit 240 calculates the count number of the rising edges of the latch signal LAT generated from when the calculation processing is executed on the correction value Cv last time to the current time point. Then, the request signal output circuit 240 determines whether the count number of the rising edges of the latch signal LAT generated from when the calculation processing is executed on the correction value Cv last time to the current time point, which is a value obtained by adding the latch count LC to the cumulative latch count TLC, is equal to or larger than a count threshold Cth (step S100). Here, the count threshold Cth is a value determined according to the degree of deterioration of the resistance wiring 401 caused by the displacement of the vibration plate 350, and is set to, for example, 10000 counts. The value set as the count threshold Cth is not limited to 10000 counts, and can be appropriately determined according to the material, the wire width, the thickness, and the like of the resistance wiring 401 formed at the vibration plate 350.

When the request signal output circuit 240 determines that the value obtained by adding the latch count LC to the cumulative latch count TLC is equal to or larger than the count threshold Cth (Y in step S100), the request signal output circuit 240 generates the correction value adjustment request signal TRC for requesting the adjustment of the correction value Cv, and outputs the generated correction value adjustment request signal TRC to the temperature information output circuit 26 (step S110). When the temperature information output circuit 26 receives the correction value adjustment request signal TRC for requesting the adjustment of the correction value Cv from the request signal output circuit 240, the temperature information output circuit 26 sets the logic level of the correction value calculation request flag Fc to the H level and stores the logic level of the correction value calculation request flag Fc in the storage circuit 570 (step S120).

When the request signal output circuit 240 determines that the value obtained by adding the latch count LC to the cumulative latch count TLC is not equal to or larger than the count threshold Cth (N in step S100), or after the temperature information output circuit 26 sets the logic level of the correction value calculation request flag Fc to the H level and stores the logic level of the correction value calculation request flag Fc in the storage circuit 570, the temperature information output circuit 26 determines whether the temperature acquisition request signal TD for acquiring the temperature of the print head 22 is received (step S130).

When the temperature information output circuit 26 determines that the temperature acquisition request signal TD for acquiring the temperature of the print head 22 is received (Y in step S130), the temperature information output circuit 26 generates the temperature information signal TI corrected with the correction value Cv and outputs the corrected temperature information signal TI to the control circuit 100 (step S140). When the control circuit 100 acquires the temperature information signal TI corrected with the correction value Cv output from the temperature information output circuit 26, the control circuit 100 corrects various signals including the control signals Ctrl-H, Ctrl-C, and Ctrl-T based on the acquired temperature information signal TI (step S150), and outputs the corrected signals to corresponding components. Accordingly, various components provided in the liquid dispensing apparatus 1 operate according to the temperature information signal TI corrected with the correction value Cv.

Thereafter, the control circuit 100 determines whether the print processing is completed (step S160). When the control circuit 100 determines that the print processing is not completed (N in step S160), the control circuit 100 outputs the control signal Ctrl-H including the clock signal SCK, the latch signal LAT, the change signal CH, and the print data signals SI1 to SIn according to the image to be formed at the medium P, and the latch counter 242 counts the rising edges of the latch signal LAT output from the control circuit 100. Then, the latch counter 242 adds "1" to the latch count LC every time the rising of the latch signal LAT is detected (step S90).

When the control circuit 100 determines that there is no print request to form a desired image at the medium (N in step S70), the control circuit 100 determines whether an execution request of flushing processing that is one of maintenance processing on the head unit 20 is generated (step S170). When the control circuit 100 determines that the execution request of flushing processing is generated (Y in step S170), the control circuit 100 causes the head unit 20 to execute the flushing processing (step S180). Accordingly, the ink stored in the print head 22 is discharged.

After the flushing processing on the head unit 20 is completed, the control circuit 500 of the temperature information output circuit 26 acquires the logic level of the correction value calculation request flag Fc stored in the storage circuit 570, and determines whether the acquired correction value calculation request flag Fc is at the H level (step S190). Then, when the correction value calculation request flag Fc acquired by the control circuit 500 is at the H level (Y in step S190), the temperature information output circuit 26 executes the calculation processing on the correction value Cv (step S200).

Here, in the calculation processing on the correction value Cv, the temperature information output circuit 26 and the correction value calculation unit 506 execute the calculation processing on the correction value Cv according to at least one of (A) the calculation of the correction value Cvv for correcting the voltage value defined by the digital reference potential signal dvref output from the control circuit 500 described above and (B) the calculation of the correction value Cvc for correcting the conversion function used when the temperature information output unit 504 converts the digital temperature information dtc into the temperature information signal TI.

Then, after the calculation processing on the correction value Cv in the temperature information output circuit 26 is completed, the request signal output circuit 240 sets the cumulative latch count TLC stored in the storage circuit 244 to "0" and sets the cumulative latch count TLC read from the storage circuit 244 to "0" (step S210), and the temperature information output circuit 26 sets the logic level of the correction value calculation request flag Fc to the L level and stores the logic level of the correction value calculation request flag Fc in the storage circuit 570 (step S220).

When the control circuit 100 determines that the print processing is ended (Y in step S160), when the control circuit 100 determines that the execution request of flushing processing is not generated (N in step S170), or after the flushing processing is executed, the temperature information output circuit 26 sets the logic level of the correction value calculation request flag Fc to the L level and stores the logic level of the correction value calculation request flag Fc in the storage circuit 570, and then the control circuit 100 determines whether the supply of the power supply voltage to the liquid dispensing apparatus 1 is continued (step S230).

When the control circuit 100 determines that the supply of the power supply voltage to the liquid dispensing apparatus 1 is continued (Y in step S230), the control circuit 100 determines whether the print request is generated in the liquid dispensing apparatus 1 (step S70). On the other hand, when the control circuit 100 determines that the supply of the power supply voltage to the liquid dispensing apparatus 1 is stopped (N in step S230), the request signal output circuit 240 stores the value obtained by adding the latch count LC to the cumulative latch count TLC as a new cumulative latch count TLC in the storage circuit 244 (step S240). Then, the liquid dispensing apparatus 1 stops operating.

1.3 Operation and Effect

In the liquid dispensing apparatus 1 and the head unit 20 according to the embodiment implemented in this way, by counting the number of rising edges of the latch signal LAT for defining the dispensing timing of the ink from the print head 22, it is possible to estimate the number of times that the vibration plate 350 is displaced, and it is also possible to estimate the degree of deterioration of the resistance wiring 401 that may occur due to the displacement of the vibration plate 350 based on the estimated number of times that the vibration plate 350 is displaced. Then, the control circuit 500 corrects the head temperature signal TC based on the unit temperature signal TH at the predetermined timing after the count number of the rising edges of the latch signal LAT for defining the dispensing timing of the ink that is counted by the latch counter 242 reaches the predetermined value. That is, the control circuit 500 corrects a change in resistance value that may occur due to the deterioration of the resistance wiring 401 at a timing in consideration of the estimated degree of deterioration of the resistance wiring 401. Accordingly, a possibility that accuracy of acquiring the temperature of the print head 22 decreases due to the deterioration of the resistance wiring 401 is reduced. As a result, correction accuracy of the control signals Ctrl-H, Ctrl-C, and Ctrl-T corrected based on the temperature of the print head 22 is improved, and the dispensing accuracy of the ink dispensed from the print head 22 is improved.

2. Second Embodiment

2.1 Functional Configuration and Operation of Liquid Dispensing Apparatus According to Second Embodiment Next, the liquid dispensing apparatus 1 and the head unit 20 according to a second embodiment will be described. In describing the liquid dispensing apparatus 1 according to the second embodiment, the same components as those of the liquid dispensing apparatus 1 according to the first embodiment are denoted by the same reference numerals, and the description thereof is omitted or simplified.

In the liquid dispensing apparatus 1 according to the first embodiment, since the resistance wiring 401 is provided at the vibration plate 350 which is displaced in an ink dispensing operation, the number of rising edges of the latch signal LAT which defines a dispensing timing is counted with respect to a change in resistance value of the resistance wiring 401 which occurs due to the use of the print head 22, and the change in resistance value which may occur due to the deterioration of the resistance wiring 401 is corrected based on the count result. Accordingly, in the liquid dispensing apparatus 1 according to the first embodiment, it is possible to correct the change in resistance value which may occur due to the deterioration of the resistance wiring 401 at a timing in consideration of a degree of the deterioration of the resistance wiring 401, and a possibility that accuracy of acquiring the temperature of the print head 22 decreases is reduced.

In contrast, in the liquid dispensing apparatus 1 according to the second embodiment, deterioration of the resistance wiring 401 caused by the use environment of the liquid dispensing apparatus 1 and the head unit 20 is appropriately corrected, thereby reducing a possibility that accuracy of acquiring the temperature of the print head 22 decreases.

Specifically, the head unit 20 provided in the liquid dispensing apparatus 1 according to the second embodiment is the head unit 20 that dispenses ink when receiving the drive signal VOUT based on the drive signal COM corrected based on the temperature information signal TI, and includes an elapsed time calculation circuit 252 that acquires elapsed time information, the temperature detection circuit 28 that outputs the unit temperature signal TH including unit temperature information th indicating the temperature of the head unit 20, the print head 22 that dispenses liquid when receiving the drive signal VOUT based on the drive signal COM, and the temperature information output circuit 26 that acquires the head temperature signal TC indicating the temperature of the print head 22 and outputs the temperature information signal TI based on the head temperature signal TC. The print head 22 includes the resistance wiring 401 and the temperature detection circuit 250 that is located at the other side surface in a stacking direction with respect to the vibration plate 350, acquires the head temperature information tc corresponding to the temperature of the pressure chamber 312, and outputs the acquired head temperature information tc as the head temperature signal TC. The temperature information output circuit 26 includes the control circuit 500 that corrects the head temperature signal TC. The control circuit 500 corrects the head temperature signal TC based on the unit temperature signal TH at a predetermined timing after the elapsed time information acquired by the elapsed time calculation circuit 252 elapses for a predetermined time.

In such a head unit 20, by correcting the head temperature signal TC based on the elapsed time information, the control circuit 500 can periodically correct the resistance value of the resistance wiring 401 regardless of a usage situation of the liquid dispensing apparatus 1. Accordingly, it is possible to periodically correct a change in resistance value of the resistance wiring 401 caused by an environment in which the liquid dispensing apparatus 1 is provided, for example, the temperature and the humidity, and physical properties of the used ink. As a result, a possibility that accuracy of acquiring the temperature of the print head 22 decreases is reduced.

Here, the elapsed time information acquired by the elapsed time calculation circuit 252 may be elapsed time information since the correction value Cv is calculated last time, or may be information on an elapsed time since the liquid dispensing apparatus 1 and the head unit 20 are manufactured and an elapsed time until the correction value Cv is calculated last time. In the following description, a case is described in which the elapsed time from when the correction value Cv is calculated last time is calculated as the elapsed time information from a time at which the correction value Cv is calculated last time and current date and time information YMD indicating a current time that are stored in the storage circuit 254. The head unit 20 may include, for example, a real time clock (RTC).

Figure 17:
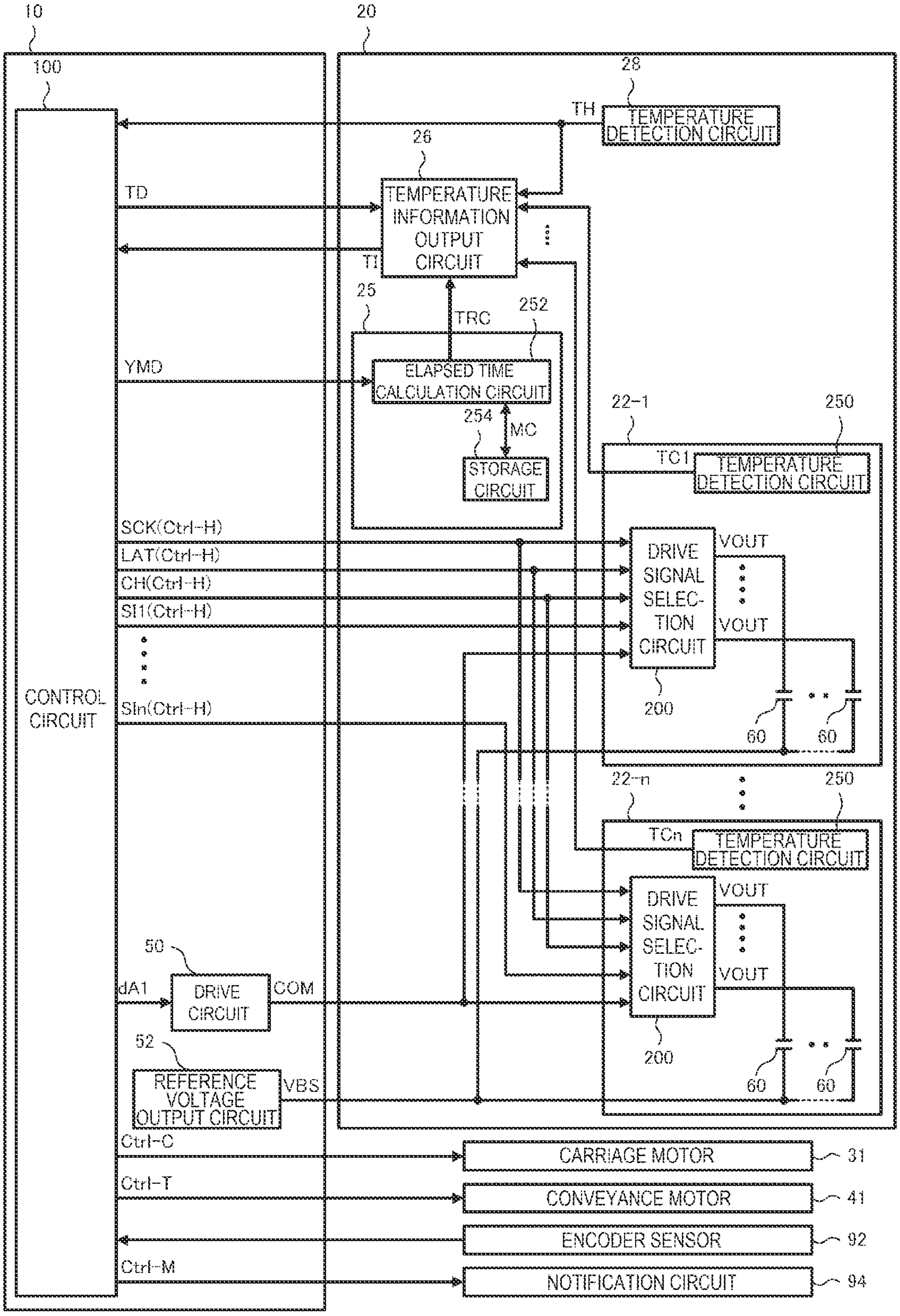
FIG. 17 is a diagram illustrating an example of a functional configuration of a liquid dispensing apparatus according to a second embodiment.

FIG. 17 is a diagram illustrating an example of a functional configuration of the liquid dispensing apparatus 1 according to the second embodiment. As illustrated in FIG. 17, similarly to the liquid dispensing apparatus 1 according to the first embodiment, the liquid dispensing apparatus 1 according to the second embodiment includes the control unit 10, the head unit 20, the carriage motor 31, the conveyance motor 41, the encoder sensor 92, and the notification circuit 94.

Similarly to the control unit 10 according to the first embodiment, the control unit 10 includes the drive circuit 50, the reference voltage output circuit 52, and the control circuit 100. The control circuit 100 receives an image information signal including image data from an external device, generates various signals for controlling the liquid dispensing apparatus 1 based on the received image information signal, and outputs the generated various signals to corresponding components.

In a specific example, the control circuit 100 receives a detection signal based on a scanning position of the carriage 21 provided in the head unit 20 from the encoder sensor 92. Then, the control circuit 100 generates the control signal Ctrl-C for controlling the movement of the head unit 20 along a scanning axis according to a scanning position of the head unit 20, and outputs the generated control signal Ctrl-C to the carriage motor 31. Accordingly, the carriage motor 31 operates to control the movement of the head unit 20 mounted at the carriage 21 along the scanning axis and the scanning position.

The control circuit 100 generates the control signal Ctrl-T for controlling the conveyance of the medium P and outputs the generated control signal Ctrl-T to the conveyance motor 41, thereby controlling the movement of the medium P along the conveyance direction. The control circuit 100 generates print data signals SI1 to SIn, a change signal CH, a latch signal LAT, and a clock signal SCK as the control signal Ctrl-H for controlling the head unit 20 based on the image information signal received from the external device and the scanning position of the head unit 20, and outputs the generated print data signals SI1 to SIn, change signal CH, latch signal LAT, and clock signal SCK to the head unit 20.

The control circuit 100 generates the temperature acquisition request signal TD for acquiring a temperature of the head unit 20 at a predetermined timing, outputs the generated temperature acquisition request signal TD to the head unit 20, and acquires the temperature information signal TI including the temperature of the head unit 20 according to the temperature acquisition request signal TD. The control circuit 100 grasps a state of the head unit 20 based on the acquired temperature information signal TI and corrects the control signals Ctrl-H, Ctrl-C, and Ctrl-T. Then, the control circuit 100 outputs the corrected control signals Ctrl-H, Ctrl-C, and Ctrl-T to corresponding components. Accordingly, the operations of the liquid dispensing apparatus 1 and the head unit 20 are controlled according to the temperature information signal TI which is a temperature of the print head 22. As a result, dispensing accuracy of the ink dispensed from the liquid dispensing apparatus 1 and the head unit 20 is improved.

The control circuit 100 generates a base drive signal dA1 that is a digital signal as the control signal Ctrl-H, and outputs the generated base drive signal dA1 to the drive circuit 50.

Similarly to the drive circuit 50 according to the first embodiment, the drive circuit 50 generates the drive signal COM having a signal waveform defined by the base drive signal dA1 and outputs the generated drive signal COM to the head unit 20. Similarly to the reference voltage output circuit 52 according to the first embodiment, the reference voltage output circuit 52 generates the reference voltage signal VBS and outputs the generated reference voltage signal VBS to the head unit 20.

Further, the control circuit 100 generates a control signal Ctrl-M for notifying a user of operation states of the drive circuit 50, the reference voltage output circuit 52, and the head unit 20, and outputs the generated control signal Ctrl-M to the notification circuit 94. Accordingly, an operation state of the liquid dispensing apparatus 1 is notified to the user.

The head unit 20 includes the print heads 22-1 to 22-*n* as the plurality of print heads 22, a correction request signal output circuit 25, the temperature information output circuit 26, and the temperature detection circuit 28.

Each of the print heads 22-1 to 22-*n* has the same structure as the print head 22 according to the first embodiment, and includes the drive signal selection circuit 200, a plurality of the piezoelectric elements 60, and the temperature detection circuit 250 including the resistance wiring 401 formed at one surface of the vibration plate 350.

The print head 22-*i* (i is any one of 2 to n) selects or deselects the signal waveform of the drive signal COM based on the received clock signal SCK, latch signal LAT, change signal CH, and print data signal SIi to generate the drive signal VOUT corresponding to each of the plurality of piezoelectric elements 60 and output the generated drive signal VOUT to the electrode 360 of the corresponding piezoelectric element 60. The reference voltage signal VBS is commonly input to the electrodes 380 of the plurality of piezoelectric elements 60 provided in the print head 22-*i*. Accordingly, the plurality of piezoelectric elements 60 provided in the print head 22-*i* are driven, and an amount of ink corresponding to the driving of the piezoelectric elements 60 is dispensed from the nozzles 321 provided in the print head 22-*i*.

The temperature detection circuit 250 provided in the print head 22-*i* acquires head temperature information tci of a voltage value according to a temperature of the print head 22-*i*, and outputs a head temperature signal TCi including the acquired head temperature information tci to the temperature information output circuit 26. Here, at least a part of the drive signal selection circuit 200 provided in the print head 22-*i* is mounted at the wiring substrate 420 of the print head 22-*i* as the integrated circuit 421, and at least a part of the temperature detection circuit 250 provided in the print head 22-*i* is provided in the print head 22-*i* as the resistance wiring 401.

Here, in the following description, a case will be described in which the print head 22 when there is no need to distinguish the print heads 22-1 to 22-*n* receives the clock signal SCK, the latch signal LAT, the change signal CH, a print data signal SI as the print data signals SI1 to SIn, the drive signal COM, and the reference voltage signal VBS. A case will be described in which the temperature detection circuit 250 of the print head 22 acquires the head temperature information tc as head temperature information tc1 to tcn of a voltage value according to the temperature of the print head 22, and the print head 22 outputs a head temperature signal TC as head temperature signals TC1 to TCn including the acquired head temperature information tc.

Similarly to the temperature detection circuit 28 according to the first embodiment, the temperature detection circuit 28 detects the temperature of the head unit 20 including the print heads 22-1 to 22-*n*, and generates the unit temperature signal TH including the unit temperature information th of the voltage value according to the detected temperature. Then, the temperature detection circuit 28 outputs the generated unit temperature signal TH to the temperature information output circuit 26 and the control circuit 100.

Similarly to the temperature information output circuit 26 according to the first embodiment, the temperature information output circuit 26 generates the temperature information signal TI according to the head temperature signals TC1 to TCn output from the print heads 22-1 to 22-*n*, the unit temperature signal TH output from the temperature detection circuit 28, and the temperature acquisition request signal TD output from the control circuit 100, and outputs the generated temperature information signal TI to the control circuit 100.

Specifically, the temperature information output circuit 26 amplifies the head temperature signals TC1 to TCn and selects the amplified head temperature signals TC1 to TCn according to the temperature acquisition request signal TD received from the control circuit 100. Then, the temperature information output circuit 26 generates the temperature information signal TI according to the selected amplified head temperature signals TC1 to TCn and outputs the generated temperature information signal TI to the control circuit 100. At this time, the temperature information output circuit 26 corrects the head temperature information tc by using a correction value Cv calculated based on the unit temperature information th included in the unit temperature signal TH.

The correction request signal output circuit 25 corresponds to the correction request signal output circuit 24 according to the first embodiment, generates the correction value adjustment request signal TRC for defining an adjustment timing of the correction value Cv of the head temperature information tc in the temperature information output circuit 26, and outputs the generated correction value adjustment request signal TRC to the temperature information output circuit 26.

Unlike the correction request signal output circuit 24 according to the first embodiment, the correction request signal output circuit 25 includes the storage circuit 254 and the elapsed time calculation circuit 252 that receives the current date and time information YMD from the control circuit 100. The storage circuit 254 stores information on an adjustment date and time at which the correction value Cv of the head temperature information tc in the temperature information output circuit 26 is adjusted. The elapsed time calculation circuit 252 calculates an elapsed time that elapses since the correction value Cv is adjusted based on the information on the adjustment date and time at which the correction value Cv of the head temperature information tc stored in the storage circuit 254 is adjusted and the current date and time information YMD received from the control circuit 100. Then, the elapsed time calculation circuit 252 generates the correction value adjustment request signal TRC indicating the adjustment timing of the correction value Cv of the head temperature information tc in the temperature information output circuit 26 at a timing corresponding to the calculated elapsed time, and outputs the generated correction value adjustment request signal TRC to the temperature information output circuit 26.

The temperature information output circuit 26 adjusts the correction value Cv of the head temperature information tc based on the unit temperature information th included in the unit temperature signal TH at a predetermined timing after receiving the correction value adjustment request signal TRC for requesting the adjustment of the correction value Cv of the head temperature information tc from the correction request signal output circuit 25. Thereafter, the temperature information output circuit 26 corrects the head temperature information tc by using the adjusted correction value Cv, and outputs the temperature information signal TI according to the amplified signal to the control circuit 100.

At this time, the temperature information output circuit 26 calculates the correction value Cv by executing calculation processing according to a calculation method of at least one of (A) the correction value Cvv for correcting the voltage value defined by the digital reference potential signal dvref output from the control circuit 500 described above and (B) the correction value Cvc for correcting the conversion function used when the temperature information output unit 504 converts the digital temperature information dtc into the temperature information signal TI.

Figure 18:
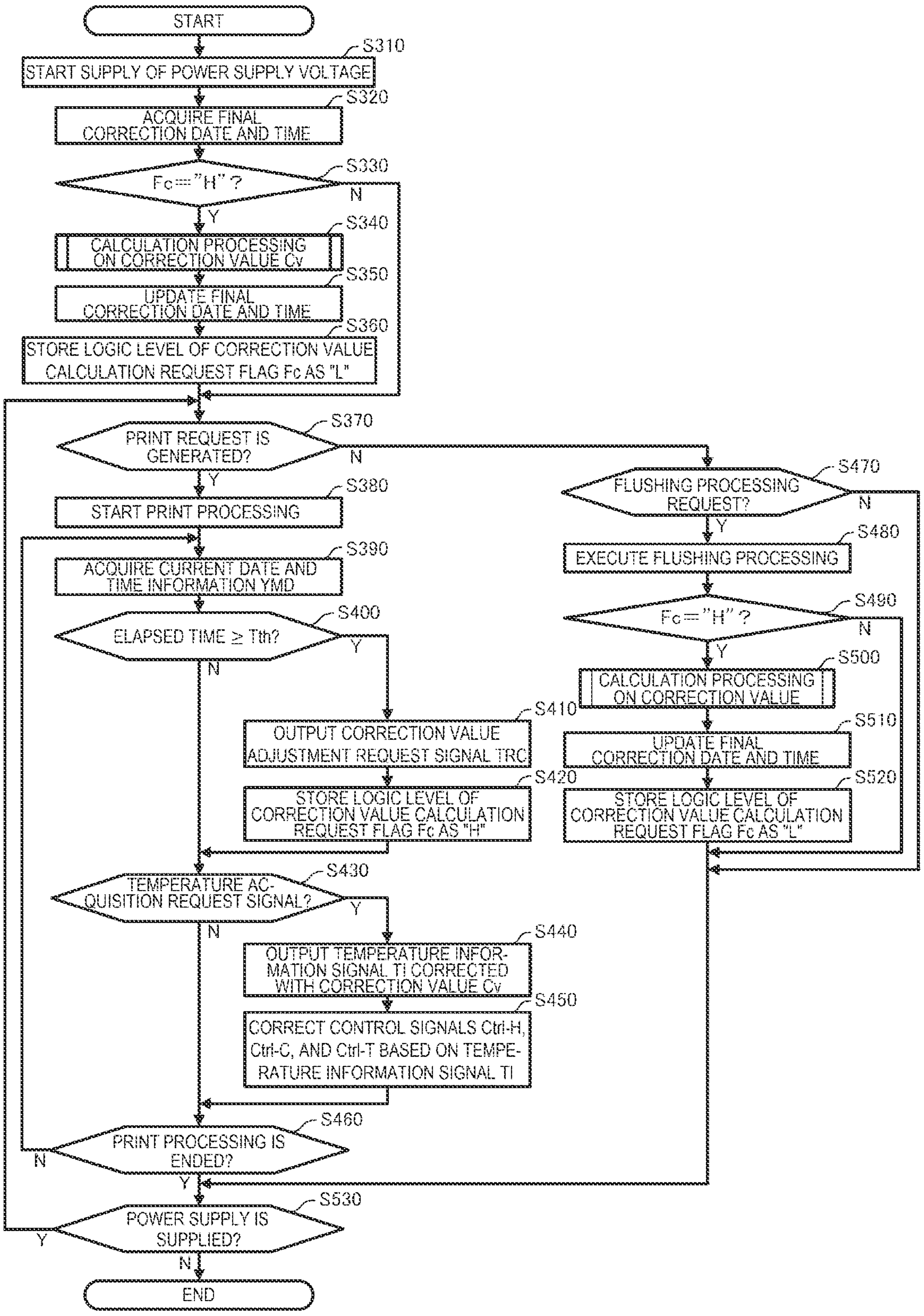
FIG. 18 is a diagram illustrating an example of operations of the liquid dispensing apparatus according to the second embodiment.

Specific examples of operations of the liquid dispensing apparatus 1 and the head unit 20 according to the second embodiment implemented in this way will be described. FIG. 18 is a diagram illustrating an example of the operation of the liquid dispensing apparatus 1 according to the second embodiment. As illustrated in FIG. 18, the liquid dispensing apparatus 1 according to the second embodiment is activated and starts the operations when supply of a power supply voltage is started (step S310). When the supply of the power supply voltage to the liquid dispensing apparatus 1 is started, the control circuit 100 acquires, from the storage circuit 254, information on a latest adjustment date and time among the adjustment dates and times at which the correction value Cv of the head temperature information tc is adjusted, as a final correction date and time (step S320). Here, the storage circuit 254 may retroactively store a plurality of pieces of information on the adjustment date and time at which the correction value Cv of the head temperature information tc is adjusted, or may store only the latest adjustment date and time information.

After the supply of the power supply voltage to the liquid dispensing apparatus 1 is started and the final correction date and time at which the correction value Cv of the head temperature information tc is adjusted is acquired from the storage circuit 254, the control circuit 500 of the temperature information output circuit 26 acquires a logic level of the correction value calculation request flag Fc stored in the storage circuit 570. Then, the control circuit 500 determines whether the acquired correction value calculation request flag Fc is at an H level (step S330).

Here, the correction value calculation request flag Fc stored in the storage circuit 570 is a flag for determining whether the correction value adjustment request signal TRC for requesting the adjustment of the correction value Cv is received from the correction request signal output circuit 24. In the embodiment, a case will be described in which the logic level of the correction value calculation request flag Fc is an L level before the correction value adjustment request signal TRC for requesting the adjustment of the correction value Cv is received from the temperature information output circuit 26, and the logic level of the correction value calculation request flag Fc is the H level when the correction value adjustment request signal TRC for requesting the adjustment of the correction value Cv is received from the temperature information output circuit 26.

When the logic level of the correction value calculation request flag Fc acquired by the control circuit 500 is the H level (Y in step S330), the temperature information output circuit 26 executes the calculation processing on the correction value Cv (step S340). In the calculation processing on the correction value Cv, the temperature information output circuit 26 and the correction value calculation unit 506 execute the calculation processing on the correction value Cv according to at least one of (A) the calculation of the correction value Cvv for correcting the voltage value defined by the digital reference potential signal dvref output from the control circuit 500 described above and (B) the calculation of the correction value Cvc for correcting the conversion function used when the temperature information output unit 504 converts the digital temperature information dtc into the temperature information signal TI.

Then, after the calculation processing on the correction value Cv in the temperature information output circuit 26 is completed, the elapsed time calculation circuit 252 stores the current date and time information YMD received from the control circuit 100 as the information on the adjustment date and time at which the correction value Cv of the head temperature information tc stored in the storage circuit 254 is adjusted. That is, among the adjustment dates and times at which the correction value Cv of the head temperature information tc stored in the storage circuit 254 is adjusted, the final correction date and time which is the information on the latest adjustment date and time is updated (step S350). Thereafter, the temperature information output circuit 26 sets the logic level of the correction value calculation request flag Fc to the L level and stores the logic level of the correction value calculation request flag Fc in the storage circuit 570 (step S360).

Then, after the temperature information output circuit 26 sets the logic level of the correction value calculation request flag Fc to the L level and stores the logic level of the correction value calculation request flag Fc in the storage circuit 570, or when the correction value calculation request flag Fc acquired by the control circuit 500 is at the L level (N in step S330), the control circuit 100 determines whether a print request is generated in the liquid dispensing apparatus 1 (step S370).

When the control circuit 100 determines that the print request is generated (Y in step S370), the control circuit 100 starts print processing (step S380). Specifically, when the print processing is started, the control circuit 100 generates the control signal Ctrl-H including the clock signal SCK, the latch signal LAT, the change signal CH, and the print data signals SI1 to SIn according to the image to be formed at the medium P, and outputs the generated control signal Ctrl-H to the head unit 20. The control circuit 100 outputs the current date and time information YMD to the elapsed time calculation circuit 252. That is, the elapsed time calculation circuit 252 acquires the current date and time information YMD (step S390). Then, the elapsed time calculation circuit 252 calculates the elapsed time from when the correction value Cv of the head temperature information tc is adjusted based on the current date and time information YMD acquired from the control circuit 100 and the final correction date and time acquired from the storage circuit 254, and determines whether the calculated elapsed time is equal to or larger than a threshold time Tth (step S400). Here, the threshold time Tth can be appropriately determined according to a use environment in which the liquid dispensing apparatus 1 is used, for example, the temperature and humidity at which the liquid dispensing apparatus 1 and the head unit 20 are provided, and physical properties of the ink used in the liquid dispensing apparatus 1 and the head unit 20.

When the elapsed time calculation circuit 252 determines that the elapsed time from when the correction value Cv of the head temperature information tc is adjusted is equal to or larger than the threshold time Tth (Y in step S400), the elapsed time calculation circuit 252 generates the correction value adjustment request signal TRC for requesting the adjustment of the correction value Cv and outputs the generated correction value adjustment request signal TRC to the temperature information output circuit 26 (step S410). When receiving the correction value adjustment request signal TRC for requesting the adjustment of the correction value Cv from the elapsed time calculation circuit 252, the temperature information output circuit 26 sets the logic level of the correction value calculation request flag Fc to the H level and stores the logic level of the correction value calculation request flag Fc in the storage circuit 570 (step S420).

When the elapsed time calculation circuit 252 determines that the elapsed time from when the correction value Cv of the head temperature information tc is adjusted is not equal to or larger than the threshold time Tth (N in step S400), or after the temperature information output circuit 26 sets the logic level of the correction value calculation request flag Fc to the H level and stores the logic level of the correction value calculation request flag Fc in the storage circuit 570, the temperature information output circuit 26 determines whether the temperature acquisition request signal TD for acquiring the temperature of the print head 22 is received (step S430).

When the temperature information output circuit 26 determines that the temperature acquisition request signal TD for acquiring the temperature of the print head 22 is received (Y in step S430), the temperature information output circuit 26 generates the temperature information signal TI corrected with the correction value Cv and outputs the corrected temperature information signal TI to the control circuit 100 (step S440). When the control circuit 100 acquires the temperature information signal TI corrected with the correction value Cv output from the temperature information output circuit 26, the control circuit 100 corrects various signals including the control signals Ctrl-H, Ctrl-C, and Ctrl-T based on the acquired temperature information signal TI (step S450), and outputs the corrected signals to corresponding components. Accordingly, various components provided in the liquid dispensing apparatus 1 operate according to the temperature information signal TI corrected with the correction value Cv.

Thereafter, the control circuit 100 determines whether the print processing is completed (step S460). When the control circuit 100 determines that the print processing is not completed (N in step S460), the control circuit 100 outputs the control signal Ctrl-H including the clock signal SCK, the latch signal LAT, the change signal CH, and the print data signals SI1 to SIn according to an image to be formed at the medium P, and the elapsed time calculation circuit 252 acquires the current date and time information YMD (step S390).

When the control circuit 100 determines that there is no print request to form a desired image at the medium (N in step S370), the control circuit 100 determines whether an execution request of flushing processing that is one of maintenance processing on the head unit 20 is generated (step S470). When the control circuit 100 determines that the execution request of flushing processing is generated (Y in step S470), the control circuit 100 causes the head unit 20 to execute the flushing processing (step S480). Accordingly, the ink stored in the print head 22 is discharged.

After the flushing processing on the head unit 20 is completed, the control circuit 500 of the temperature information output circuit 26 acquires the logic level of the correction value calculation request flag Fc stored in the storage circuit 570, and determines whether the acquired correction value calculation request flag Fc is at the H level (step S490). Then, when the correction value calculation request flag Fc acquired by the control circuit 500 is at the H level (Y in step S490), the temperature information output circuit 26 executes the calculation processing on the correction value Cv (step S500).

Here, in the calculation processing on the correction value Cv, the temperature information output circuit 26 and the correction value calculation unit 506 execute the calculation processing on the correction value Cv according to at least one of (A) the calculation of the correction value Cvv for correcting the voltage value defined by the digital reference potential signal dvref output from the control circuit 500 described above and (B) the calculation of the correction value Cvc for correcting the conversion function used when the temperature information output unit 504 converts the digital temperature information dtc into the temperature information signal TI.

Then, after the calculation processing on the correction value Cv in the temperature information output circuit 26 is completed, the elapsed time calculation circuit 252 stores the current date and time information YMD received from the control circuit 100 as the information on the adjustment date and time at which the correction value Cv of the head temperature information tc stored in the storage circuit 254 is adjusted. That is, among the adjustment dates and times at which the correction value Cv of the head temperature information tc stored in the storage circuit 254 is adjusted, the final correction date and time which is the information on the latest adjustment date and time is updated (step S510). Thereafter, the temperature information output circuit 26 sets the logic level of the correction value calculation request flag Fc to the L level and stores the logic level of the correction value calculation request flag Fc in the storage circuit 570 (step S520).

When the control circuit 100 determines that the print processing is ended (Y in step S460), when the control circuit 100 determines that the execution request of flushing processing is not generated (N in step S470), or after the flushing processing is executed, the temperature information output circuit 26 sets the logic level of the correction value calculation request flag Fc to the L level and stores the logic level of the correction value calculation request flag Fc in the storage circuit 570, and then the control circuit 100 determines whether the supply of the power supply voltage to the liquid dispensing apparatus 1 is continued (step S530).

When the control circuit 100 determines that the supply of the power supply voltage to the liquid dispensing apparatus 1 is continued (Y in step S530), the control circuit 100 determines whether the print request is generated in the liquid dispensing apparatus 1 (step S370). On the other hand, when the control circuit 100 determines that the supply of the power supply voltage to the liquid dispensing apparatus 1 is stopped (N in step S530), the liquid dispensing apparatus 1 stops operating.

2.2 Operation and Effect

In the liquid dispensing apparatus 1 and the head unit 20 according to the second embodiment implemented in this way, by correcting the head temperature signal TC based on the elapsed time information, the control circuit 500 can periodically correct the resistance value of the resistance wiring 401 regardless of the usage situation of the liquid dispensing apparatus 1. Accordingly, it is possible to periodically correct a change in resistance value of the resistance wiring 401 caused by an environment in which the liquid dispensing apparatus 1 is provided, for example, the temperature and the humidity, and physical properties of the used ink. As a result, a possibility that accuracy of acquiring the temperature of the print head 22 decreases is reduced.

3. Modification

A case is described in which in the liquid dispensing apparatus 1 and the head unit 20 according to the first embodiment, the rising edge of the latch signal LAT, that is, the dispensing timing of the ink from the print head 22 is counted, the degree of deterioration of the resistance wiring 401 is estimated based on the count result, and a calculation cycle of the correction value Cv according to an estimation result is determined, and in the liquid dispensing apparatus 1 and the head unit 20 according to the second embodiment, the degree of deterioration of the resistance wiring 401 caused by the use environment is estimated based on a period according to the use environment of the liquid dispensing apparatus 1 and the head unit 20, and the calculation cycle of the correction value Cv according to the estimation result is determined. However, the methods for estimating the degree of deterioration of the resistance wiring 401 may be used in combination in the liquid dispensing apparatus 1 and the head unit 20. Accordingly, the correction accuracy of the resistance value due to the deterioration of the resistance wiring 401 can be further improved, and the accuracy of acquiring the temperature of the print head 22 is further improved. Further, since the operations of the liquid dispensing apparatus 1 and the head unit 20 controlled according to the temperature information signal TI, which is the temperature of the print head 22, are controlled, the dispensing accuracy of the ink dispensed from the liquid dispensing apparatus 1 and the head unit 20 is further improved.

Here, the drive signal COM and the drive signal VOUT based on the drive signal COM are examples of a drive signal, the head temperature information tc is an example of temperature information, and the head temperature signal TC is an example of a temperature signal. The temperature detection circuit 28 is an example of a unit temperature detection circuit, the elapsed time calculation circuit 252 is an example of an elapsed time acquisition unit, the temperature detection circuit 250 and the resistance wiring 401 provided in the temperature detection circuit 250 are examples of a temperature signal acquisition unit, the control circuit 500 is an example of a correction circuit, and the storage circuit 570 is an example of a storage circuit. Further, the electrode 360 is an example of a first electrode, the electrode 380 is an example of a second electrode, and the direction along the Z axis is an example of the stacking direction.

Although the embodiments and the modification are described above, the present disclosure is not limited to the embodiments and can be implemented in various aspects without departing from the gist thereof. For example, the embodiments described above can be appropriately combined.

The present disclosure has substantially the same configurations as the configurations described in the embodiments, such as a configuration having the same function, method, and result and a configuration having the same object and effect. The present disclosure has a configuration in which non-essential parts of the configurations described in the embodiments are replaced. The present disclosure has a configuration capable of achieving the same function and effect or a configuration capable of achieving the same object as the configuration described in the embodiments. Further, the present disclosure has a configuration obtained by adding a known technique to the configurations described in the embodiments.

The following contents are derived from the above-described embodiments.

A head unit according to an aspect is a head unit for dispensing liquid when receiving a drive signal corrected based on a temperature information signal, the head unit includes:

an elapsed time acquisition unit configured to acquire elapsed time information;

a unit temperature detection circuit configured to output a unit temperature signal including unit temperature information indicating a temperature of the head unit;

a print head configured to dispense the liquid when receiving the drive signal; and a temperature information output circuit configured to acquire a temperature signal indicating a temperature of the print head and output the temperature information signal based on the temperature signal, in which the print head includes a piezoelectric element including a first electrode, a second electrode, and a piezoelectric body located between the first electrode and the second electrode in a stacking direction in which the first electrode, the second electrode, and the piezoelectric body are stacked, the piezoelectric element being configured to be driven when receiving the drive signal, a vibration plate located at one side in the stacking direction with respect to the piezoelectric element and configured to be deformed when the piezoelectric element is driven, a pressure chamber substrate located at the one side in the stacking direction with respect to the vibration plate and provided with a pressure chamber whose volume changes when the vibration plate is deformed, a nozzle configured to dispense the liquid according to a change in volume of the pressure chamber, and a temperature detection unit located at the other side in the stacking direction with respect to the vibration plate and configured to detect temperature information corresponding to a temperature of the pressure chamber and output the detected temperature information as the temperature signal, the temperature information output circuit includes a correction circuit configured to correct the temperature signal, and the correction circuit corrects the temperature signal based on the unit temperature information at a predetermined timing after the elapsed time information acquired by the elapsed time acquisition unit elapses a predetermined time.

According to the head unit, it is possible to perform appropriate calibration in consideration of a change in use environment by periodically performing calibration based on information from the elapsed time acquisition unit.

In an aspect of the head unit, the temperature information output circuit may include an amplification circuit configured to amplify a difference between a reference potential signal and the temperature signal, and the correction circuit may correct the temperature signal based on the unit temperature information by adjusting a voltage value of the reference potential signal supplied to the amplification circuit.

In an aspect of the head unit, the temperature information output circuit may include a storage circuit configured to store a conversion function for converting the temperature signal into the temperature information signal, and the correction circuit may correct the temperature signal by adjusting the conversion function stored in the storage circuit.

In an aspect of the head unit, the predetermined timing may be when power is turned on.

In an aspect of the head unit, the predetermined timing may be after flushing processing is executed.

According to the head unit, since a normal value is not detected when the calibration is performed in a state where the ink in a cavity increases in viscosity, the calibration is performed after flushing is performed and fresh ink is drawn into the cavity.

A liquid dispensing apparatus according to an aspect includes:

a drive circuit configured to output a drive signal corrected based on a temperature information signal; and a head unit configured to dispense liquid when receiving the drive signal, in which the head unit includes an elapsed time acquisition unit configured to acquire elapsed time information, a unit temperature detection circuit configured to output a unit temperature signal including unit temperature information indicating a temperature of the head unit, a print head configured to dispense the liquid when receiving the drive signal, and a temperature information output circuit configured to acquire a temperature signal indicating a temperature of the print head and output the temperature information signal based on the temperature signal, the print head includes a piezoelectric element including a first electrode, a second electrode, and a piezoelectric body located between the first electrode and the second electrode in a stacking direction in which the first electrode, the second electrode, and the piezoelectric body are stacked, the piezoelectric element being configured to be driven when receiving the drive signal, a vibration plate located at one side in the stacking direction with respect to the piezoelectric element and configured to be deformed when the piezoelectric element is driven, a pressure chamber substrate located at the one side in the stacking direction with respect to the vibration plate and provided with a pressure chamber whose volume changes when the vibration plate is deformed, a nozzle configured to dispense the liquid according to a change in volume of the pressure chamber, and a temperature detection unit located at the other side in the stacking direction with respect to the vibration plate and configured to detect temperature information corresponding to a temperature of the pressure chamber and output the detected temperature information as the temperature signal, the temperature information output circuit includes a correction circuit configured to correct the temperature signal, and the correction circuit corrects the temperature signal based on the unit temperature information at a predetermined timing after the elapsed time information acquired by the elapsed time acquisition unit elapses a predetermined time.

According to the liquid dispensing apparatus, it is possible to perform appropriate calibration in consideration of a change in use environment by periodically performing calibration based on the information from the elapsed time acquisition unit.

In an aspect of the liquid dispensing apparatus, the temperature information output circuit may include an amplification circuit configured to amplify a difference between a reference potential signal and the temperature signal, and the correction circuit may correct the temperature signal based on the unit temperature information by adjusting a voltage value of the reference potential signal supplied to the amplification circuit.

In an aspect of the liquid dispensing apparatus, in which the temperature information output circuit may include a storage circuit configured to store a conversion function for converting the temperature signal into the temperature information signal, and the correction circuit may correct the temperature signal by adjusting the conversion function stored in the storage circuit.

In an aspect of the liquid dispensing apparatus, in which the predetermined timing may be when power is turned on.

In an aspect of the liquid dispensing apparatus, in which the predetermined timing may be after flushing processing is executed.

According to the liquid dispensing apparatus, since a normal value is not detected when the calibration is performed in a state where the ink in a cavity increases in viscosity, the calibration is performed after flushing is performed and fresh ink is drawn into the cavity.

What is claimed is:

1. A head unit for dispensing liquid when receiving a drive signal corrected based on a temperature information signal, the head unit comprising:

an elapsed time acquisition unit configured to acquire elapsed time information;

a unit temperature detection circuit configured to output a unit temperature signal including unit temperature information indicating a temperature of the head unit;

a print head configured to dispense the liquid when receiving the drive signal; and a temperature information output circuit configured to acquire a temperature signal indicating a temperature of the print head and output the temperature information signal based on the temperature signal, wherein the print head includes a piezoelectric element including a first electrode, a second electrode, and a piezoelectric body located between the first electrode and the second electrode in a stacking direction in which the first electrode, the second electrode, and the piezoelectric body are stacked, the piezoelectric element being configured to be driven when receiving the drive signal, a vibration plate located at one side in the stacking direction with respect to the piezoelectric element and configured to be deformed when the piezoelectric element is driven, a pressure chamber substrate located at the one side in the stacking direction with respect to the vibration plate and provided with a pressure chamber whose volume changes when the vibration plate is deformed, a nozzle configured to dispense the liquid according to a change in volume of the pressure chamber, and a temperature detection unit located at the other side in the stacking direction with respect to the vibration plate and configured to detect temperature information corresponding to a temperature of the pressure chamber and output the detected temperature information as the temperature signal, the temperature information output circuit includes a correction circuit configured to correct the temperature signal, and the correction circuit corrects the temperature signal based on the unit temperature information at a predetermined timing after the elapsed time information acquired by the elapsed time acquisition unit elapses a predetermined time.

2. The head unit according to claim 1, wherein the temperature information output circuit includes an amplification circuit configured to amplify a difference between a reference potential signal and the temperature signal, and the correction circuit corrects the temperature signal based on the unit temperature information by adjusting a voltage value of the reference potential signal supplied to the amplification circuit.

3. The head unit according to claim 1, wherein the temperature information output circuit includes a storage circuit configured to store a conversion function for converting the temperature signal into the temperature information signal, and the correction circuit corrects the temperature signal by adjusting the conversion function stored in the storage circuit.

4. The head unit according to claim 1, wherein the predetermined timing is when power is turned on.

5. The head unit according to claim 1, wherein the predetermined timing is after flushing processing is executed.

6. A liquid dispensing apparatus comprising:

a drive circuit configured to output a drive signal corrected based on a temperature information signal; and a head unit configured to dispense liquid when receiving the drive signal, wherein the head unit includes an elapsed time acquisition unit configured to acquire elapsed time information, a unit temperature detection circuit configured to output a unit temperature signal including unit temperature information indicating a temperature of the head unit, a print head configured to dispense the liquid when receiving the drive signal, and a temperature information output circuit configured to acquire a temperature signal indicating a temperature of the print head and output the temperature information signal based on the temperature signal, the print head includes a piezoelectric element including a first electrode, a second electrode, and a piezoelectric body located between the first electrode and the second electrode in a stacking direction in which the first electrode, the second electrode, and the piezoelectric body are stacked, the piezoelectric element being configured to be driven when receiving the drive signal, a vibration plate located at one side in the stacking direction with respect to the piezoelectric element and configured to be deformed when the piezoelectric element is driven, a pressure chamber substrate located at the one side in the stacking direction with respect to the vibration plate and provided with a pressure chamber whose volume changes when the vibration plate is deformed, a nozzle configured to dispense the liquid according to a change in volume of the pressure chamber, and a temperature detection unit located at the other side in the stacking direction with respect to the vibration plate and configured to detect temperature information corresponding to a temperature of the pressure chamber and output the detected temperature information as the temperature signal, the temperature information output circuit includes a correction circuit configured to correct the temperature signal, and the correction circuit corrects the temperature signal based on the unit temperature information at a predetermined timing after the elapsed time information acquired by the elapsed time acquisition unit elapses a predetermined time.

7. The liquid dispensing apparatus according to claim 6, wherein the temperature information output circuit includes an amplification circuit configured to amplify a difference between a reference potential signal and the temperature signal, and the correction circuit corrects the temperature signal based on the unit temperature information by adjusting a voltage value of the reference potential signal supplied to the amplification circuit.

8. The liquid dispensing apparatus according to claim 6, wherein the temperature information output circuit includes a storage circuit configured to store a conversion function for converting the temperature signal into the temperature information signal, and the correction circuit corrects the temperature signal by adjusting the conversion function stored in the storage circuit.

9. The liquid dispensing apparatus according to claim 6, wherein the predetermined timing is when power is turned on.

10. The liquid dispensing apparatus according to claim 6, wherein the predetermined timing is after flushing processing is executed.

* * * * *